US012782498B2

(12) United States Patent
Ren et al.

(10) Patent No.: US 12,782,498 B2
(45) Date of Patent: Nov. 3, 2026

(54) APPLYING PORT DIVERSITY OF VIRTUAL ARRAY FOR IMPROVING SENSING CAPABILITY WITH JOINT COMMUNICATION LINKS

(71) Applicant: MEDIATEK INC., Hsinchu City (TW)

(72) Inventors: Jiaying Ren, San Jose, CA (US); Rui Zhang, San Jose, CA (US); Shiauhe Tsai, San Jose, CA (US)

(73) Assignee: MEDIATEK INC., Hsinchu City (TW)

( * ) Notice: Subject to any disclaimer, the term of this patent is extended or adjusted under 35 U.S.C. 154(b) by 261 days.

(21) Appl. No.: 18/642,914

(22) Filed: Apr. 23, 2024

(65) Prior Publication Data

US 2024/0377503 A1 Nov. 14, 2024

Related U.S. Application Data

(60) Provisional application No. 63/498,563, filed on Apr. 27, 2023.

(51) Int. Cl.
*G01S 7/00* (2006.01)
*G01S 7/02* (2006.01)
*G01S 13/44* (2006.01)

(52) U.S. Cl.
CPC ............ *G01S 7/006* (2013.01); *G01S 7/0231* (2021.05); *G01S 13/4463* (2013.01)

(58) Field of Classification Search
CPC ..... H04B 7/0413; H04B 7/0667; G01S 13/26; G01S 13/4463; G01S 7/006; G01S 7/0231; H04L 5/14; H04W 24/10
See application file for complete search history.

(56) References Cited

U.S. PATENT DOCUMENTS 8,169,889 B2 * 5/2012 Walton ................. H04B 7/0615 370/208
8,385,459 B2 * 2/2013 Ogawa ................ H04J 13/0062 375/295
9,485,683 B2 * 11/2016 Chincholi ............. H04W 24/10
10,075,226 B2 * 9/2018 Yang .................... H04B 7/0671
11,474,197 B2 * 10/2022 Bayesteh ................ G01S 7/006
11,777,651 B2 * 10/2023 Yun ..................... H04L 27/2603 370/338
11,982,760 B2 * 5/2024 Hipke ........................ G01S 7/03
2011/0140949 A1 * 6/2011 Lee ...................... H01Q 21/061 342/107

(Continued)

*Primary Examiner* — Peter M Bythrow
(74) *Attorney, Agent, or Firm* — McClure, Qualey & Rodack, LLP

(57) ABSTRACT

A method of joint communication and sensing of a target obstacle (object or human) is disclosed. The method comprises deploying a joint communication and sensing transceiver, comprising a transmitter (TX) having at least two transmitting antennas and a receiver (RX) having at least one receiving antenna; transmitting at least two radio frequency (RF) signals carrying data to a communication receiver by the at least two transmitting antennas; and receiving at least one reflected radio frequency (RF) signal reflected by the target obstacle by the at least one receiving antenna; wherein the at least two RF signals transmitted by the at least two transmitting antennas are applied with cyclic shift diversity; and wherein the at least two RF signals transmitted by the at least two transmitting antennas contain TX-varying phase rotations.

20 Claims, 13 Drawing Sheets

1500

(56) References Cited

U.S. PATENT DOCUMENTS

2013/0142276 A1* 6/2013 Baik .................... H04B 7/0671
375/295
2013/0322279 A1* 12/2013 Chincholi ............. H04L 43/106
370/252
2017/0276770 A1* 9/2017 Lin .......................... H01Q 3/24
2019/0074886 A1* 3/2019 Yoon .................... H04B 7/0617
2019/0235066 A1* 8/2019 Iida ......................... G01S 13/42
2019/0305999 A1* 10/2019 Ling ....................... G01S 13/89
2019/0383925 A1* 12/2019 Gulati ..................... G01S 7/006
2019/0391230 A1* 12/2019 Loesch ................... G01S 13/42
2019/0391247 A1* 12/2019 Gulati ................... G01S 13/341
2021/0058889 A1* 2/2021 Zhang ................... H04L 5/0048
2021/0076367 A1* 3/2021 Bayesteh ................ H04W 4/70
2021/0185669 A1* 6/2021 Bai ...................... H04B 7/0667
2021/0195457 A1* 6/2021 Kim ........................ H04L 5/005
2021/0286045 A1* 9/2021 Bayesteh ................ G01S 7/006
2022/0053443 A1* 2/2022 Kim ...................... H04W 56/00
2022/0279360 A1* 9/2022 Matsumura ........... H04L 5/0017
2022/0279581 A1* 9/2022 Baek ..................... H04W 64/00
2023/0254838 A1* 8/2023 Kim .......................... H04L 5/00
370/329
2023/0314591 A1* 10/2023 Lee ......................... G01S 13/86
342/52
2023/0358853 A1* 11/2023 Kumari ................. G01S 13/003
2023/0412216 A1* 12/2023 Gong ................... H04B 7/0413
2024/0219547 A1* 7/2024 Pandharipande ..... G01S 13/931
2024/0406914 A1* 12/2024 Lee ........................... G01S 5/00
2024/0430039 A1* 12/2024 Duan .................... G01S 13/003
2025/0112809 A1* 4/2025 Duan ...................... G01S 7/006
2025/0202652 A1* 6/2025 Matsumura ........... H04W 72/04
2025/0370087 A1* 12/2025 Nilsson ................... G01S 7/006

* cited by examiner

APPLYING PORT DIVERSITY OF VIRTUAL ARRAY FOR IMPROVING SENSING CAPABILITY WITH JOINT COMMUNICATION LINKS

CROSS-REFERENCE TO RELATED APPLICATIONS

The present Application claims the benefit of U.S. Provisional Patent Application Ser. No. 63/498,563 filed on Apr. 27, 2023, the entire disclosure of which is incorporated herein in its entirety by reference.

BACKGROUND OF THE INVENTION

1. Field of the Invention

This disclosure generally relates to joint communications and sensing, and more particularly, to a method of applying port diversity of virtual array for improving sensing capability with joint communication links.

2. Description of Related Art

In a typical mobile communication environment, a User Equipment (UE) (also called as a Mobile Station (MS)), such as a mobile phone (also known as a cellular phone or cell phone), a tablet Personal Computer (PC), or a vehicle with wireless communication capability may communicate voice and/or data signals with a wireless communication network. The wireless communication between the UE and the wireless communication network may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and New Radio (NR) technology etc. In particular, GSM/GPRS/EDGE technology is also called 2G technology; WCDMA/CDMA-2000/TD-SCDMA technology is also called 3G technology; LTE/LTE-A/TD-LTE technology is also called 4G technology; and NR technology is also called 5G technology.

However, if the sensing process for target obstacles (objects or humans) were to be performed standalone and provided with a specific type of 5G NR waveform, i.e., constant-envelope sequences with zero autocorrelation properties for sensing purpose only, which brings ineffectiveness. It is desired to have a sensing process with flexibility and to improve the sensing capability of the sensing process.

SUMMARY OF THE INVENTION

In one aspect of the present disclosure, a method of joint communication and sensing of a target obstacle (object or human) is disclosed. The method comprises deploying a joint communication and sensing transceiver, comprising a transmitter (TX) having at least two transmitting antennas and a receiver (RX) having at least one receiving antenna; transmitting at least two radio frequency (RF) signals carrying data to a communication receiver by the at least two transmitting antennas; and receiving at least one reflected radio frequency (RF) signal reflected by the target obstacle by the at least one receiving antenna; wherein the at least two RF signals transmitted by the at least two transmitting antennas are applied with cyclic shift diversity; and wherein the at least two RF signals transmitted by the at least two transmitting antennas contain TX-varying phase rotations.

In another aspect of the present disclosure, the at least two RF signals are cyclic shifted in time domain.

In yet another aspect of the present disclosure, a virtual receiving array is generated by the at least two transmitting antennas and the at least one receiving antenna.

In yet another aspect of the present disclosure, the at least two transmitting antennas form at least one transmitting array.

In yet another aspect of the present disclosure, the at least two radio frequency (RF) signals are orthogonal frequency domain multiplexing (OFDM) signals.

In yet another aspect of the present disclosure, the at least two radio frequency (RF) signals form virtually orthogonal transmitter (TX) ports that are distinguishable at each of the at least one receiving antenna of the joint communication and sensing transceiver.

In another aspect of the present disclosure, the TX-varying phase rotations are determined based on spatial domain information of the communication receiver.

In another aspect of the present disclosure, the spatial domain information is a transmit precoder matrix indicator (TPMI) selected by the communication receiver and sent from the communication receiver.

In another aspect of the present disclosure, the at least two transmitting antennas form at least one transmitting array and the cyclic shift diversity and the TX-varying phase rotation for each of the at least two transmitting antennas are chosen for the at least one transmitting array to generate a beam pattern of an angle of departure (AoD) whose angular frequency-domain flatness mainlobe direction aligns with that of a phase vector of the selected TPMI.

In another aspect of the present disclosure, a method of joint communication and sensing a target obstacle (object or human) is disclosed. The method comprises deploying a joint communication and sensing transceiver, comprising a transmitter (TX) having at least two transmitting antennas and a receiver (RX) having at least one receiving antenna; transmitting at least two radio frequency (RF) signals carrying data to a communication receiver by the at least two transmitting antennas; and receiving at least one reflected radio frequency (RF) signal reflected by the target obstacle by the at least one receiving antenna; wherein the at least two RF signals transmitted by the at least two transmitting antennas are applied with cyclic shift diversity.

In another aspect of the present disclosure, the at least two RF signals are cyclic shifted in time domain.

In another aspect of the present disclosure, a virtual receiving array is generated by the at least two transmitting antennas and the at least one receiving antenna.

In another aspect of the present disclosure, the at least two transmitting antennas form at least one transmitting array.

In another aspect of the present disclosure, the at least two radio frequency (RF) signals are orthogonal frequency domain multiplexing (OFDM) signals.

In another aspect of the present disclosure, the at least two radio frequency (RF) signals form virtually orthogonal transmitter (TX) ports that are distinguishable at each of the at least one receiving antenna of the joint communication and sensing transceiver.

In another aspect of the present disclosure, an azimuth angle and an elevation angle of the target obstacle is obtained.

In another aspect of the present disclosure, a device capable of joint communication and sensing of a target obstacle (object or human) is disclosed. The device comprises a joint communication and sensing transceiver, comprising a transmitter (TX) having at least two transmitting antennas and a receiver (RX) having at least one receiving antenna; wherein the at least two transmitting antennas transmit data on at least two cyclic shifted radio frequency (RF) signals to a communication receiver; and wherein the at least one receiving antenna receives at least one reflected cyclic shifted radio frequency (RF) signal reflected by the target obstacle; and wherein at least two cyclic shifted radio frequency (RF) signals contain TX-varying phase rotations.

In another aspect of the present disclosure, the at least two cyclic shifted radio frequency (RF) signals form virtually orthogonal transmitter (TX) ports that are distinguishable at each of the at least one receiving antenna of the joint communication and sensing transceiver In another aspect of the present disclosure, the TX-varying phase rotations are determined based on spatial domain information of the communication receiver In another aspect of the present disclosure, the spatial domain information is a transmit precoder matrix indicator (TPMI) selected by the communication receiver and sent from the communication receiver.

These and other features and advantages of the present disclosure can be more readily understood from the following preferred embodiments with reference to the appended drawings.

BRIEF DESCRIPTION OF THE DRAWINGS

In order to sufficiently understand the essence, advantages and the preferred embodiments, the following detailed description will be more clearly understood by referring to the accompanying drawings.

FIG. 2(*b*) illustrates a virtual aperture of the array configuration in accordance with the first embodiment of the present disclosure.

FIG. 3(*b*) illustrates a virtual aperture of the array configuration in accordance with the second embodiment of the present disclosure.

FIG. 4(*b*) illustrates a virtual aperture of the array configuration in accordance with the third embodiment of the present disclosure.

FIG. 5(*b*) illustrates a virtual aperture of the array configuration in accordance with the fourth embodiment of the present disclosure.

DETAILED DESCRIPTION OF THE DRAWINGS

The following description discloses the preferred embodiments. The present disclosure is described below by referring to the embodiments and the figures. Thus, the present disclosure is not intended to be limited to the embodiments shown, but is to be accorded the principles disclosed herein. Furthermore, that various modifications or changes in light thereof will be suggested to a person having ordinary skill in the art and are to be included within the spirit and purview of this application and scope of the appended claims.

First of all, sensing surrounding target obstacles (objects or humans) through signal delay measurement and Doppler shift detection is commonly known and used in radar engineering. In a radar sensing system, it usually transmits several radio waves by transmitters and then receives reflected radio waves by receivers to determine one or more characteristics of the surrounding target obstacles, such as distances, azimuth angles, elevation angles, and/or velocities of the target obstacles.

The transmitters and receivers in the radar system may or may not be co-located. If transmitters and receivers are located at the same location, it is known as a monostatic sensing system. If transmitters and receivers are located at different locations, it is known as bistatic sensing system.

In 5G NR, MIMO (Multiple Input Multiple Output) technology deploys multiple antennas at both the transmitter and receiver (UE and gNB) to improve data throughput and reliability based on spatial multiplexing and spatial.

In 5G NR, sensing and communication are performed separately because constant-envelope sequences with zero autocorrelation properties are designed to use for sensing purpose only. Transmitting antenna ports are merely used for communication or gNB sounding. However, transmitted radio frequency (RF) signals intended for communication in essence have similar radio characteristics with those intended for sensing. Accordingly, transmitted RF signals intended for communication could be reused to provide sensing ability.

Figure 1:
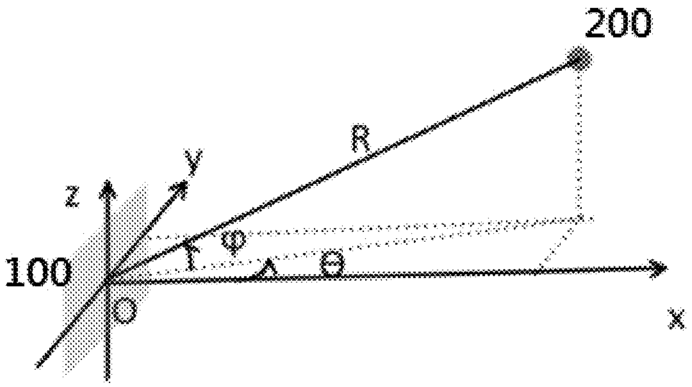
FIG. 1 illustrates a geometry model of a collocated MIMO array.

Now refer to FIG. 1 which illustrates a geometry model of a collocated MIMO array (100).

The collocated MIMO array (100) has $M_T$ transmitting (TX) antennas and $L_R$ receiving (RX) antennas. Let $$(x_m^T, y_m^T, z_m^T)$$

be the location of the m$^{th}$ TX and $$(x_l^R, y_l^R, z_l^R)$$

be the location of the l$^{th}$ RX. The geometric center of the collocated MIMO array (100) is chosen as the origin of the coordinate O=(0,0,0) for simplicity. Let (R,θ,φ) or (x,y,z) denote the location parameters of a target (200), where R is the distance from the origin of the collocated MIMO array (100) to the target (200), θ is the azimuth angle, and φ is the elevation angle, and the transformation from Polar coordinate system to Cartesian coordinate system is as follows.

$$\begin{cases} x &= R\cos\varphi\cos\theta \\ y &= R\cos\varphi\sin\theta \\ z &= R\sin\varphi \end{cases}$$

The distance from the m$^{th}$ TX to the target (200) is $$R_m = \sqrt{(x_m^T - x)^2 + (y_m^T - y)^2 + (z_m^T - z)^2},$$

and the distance from the target (200) to the l$^{th}$ RX is $$R_l = \sqrt{(x_l^R - x)^2 + (y_l^R - y)^2 + (z_l^R - z)^2}.$$

Under the far-field assumption $$\left(\frac{2D^2}{\lambda} \ll R\right),$$

where D is the size of the collocated MIMO array (100) and λ is the wavelength corresponding to the carrier frequency, $R_m$ and $R_l$ can be approximated as follows.

$$R_m = R - x_m^T\cos\varphi\cos\theta - y_m^T\cos\varphi\sin\theta - z_m^T\sin\varphi$$
$$R_l = R - x_l^R\cos\varphi\cos\theta - y_l^R\cos\varphi\sin\theta - z_l^R\sin\varphi$$

Then, the round-trip distance between the target (200) and TX/RX is as follows.

$$R_m + R_l = 2R - (x_m^T + x_l^R)\cos\varphi\cos\theta - (y_m^T + y_l^R)\cos\varphi\sin\theta - (z_m^T + z_l^R)\sin\varphi$$

Upon the condition that each TX can be identified and separated at the receiver, the array response of the collocated MIMO array (100) is equivalent to that of the SIMO array with a virtual receiving array, which can be defined as follows.

$$\{(x_m^T + x_l^R,\ y_m^T + y_l^R,\ z_m^T + z_l^R),\ m = 0, 1, \ldots, M_T - 1, l = 0, 1, \ldots, L_R - 1\}$$

This virtual receiving array, also referred to as virtual aperture, has $M_TL_R$ elements that are obtained via the spatial convolution of the TX and RX of the collocated MIMO array (100). Due to the enlarged virtual receiving array, the collocated MIMO array (100) has many advantages such as higher spatial resolution, improved parameter identifiability and enhanced system performance.

Figure 2A:
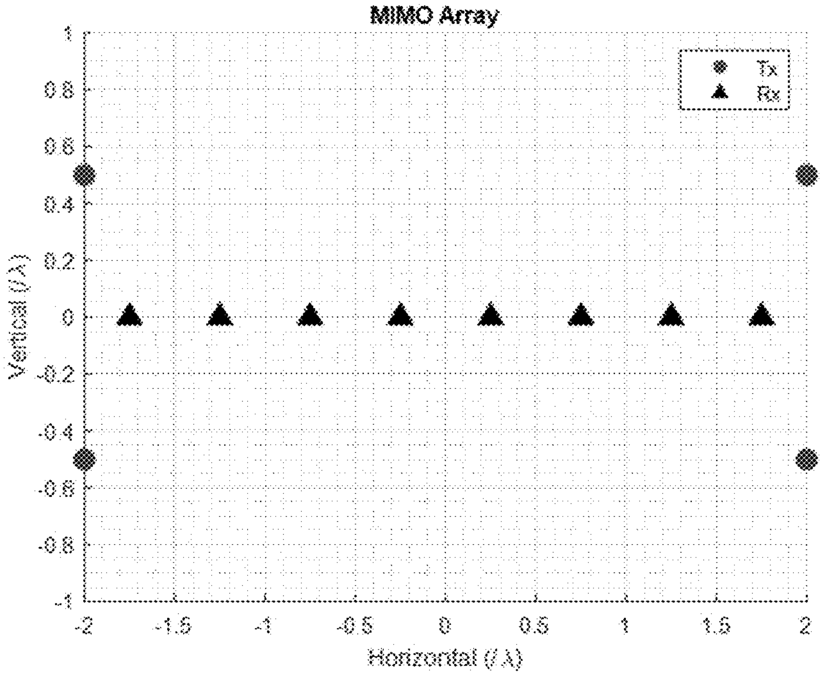
FIG. 2(*a*) illustrates an array configuration used for joint communication and sensing in accordance with a first embodiment of the present disclosure.
Figure 2B:
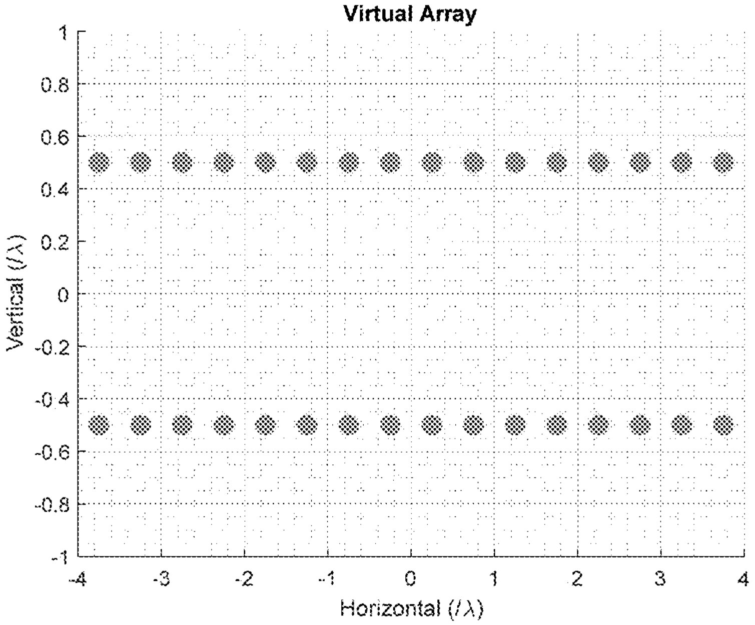

Now refer to FIG. 2(*a*), illustrating an array configuration used for joint communication and sensing in accordance with a first embodiment of the present disclosure.

The array configuration in accordance with the first embodiment of the present disclosure has 4 TX (i.e. $M_T$=4) and 8 RX (i.e. $L_R$=8), where a uniform filled (i.e., 0.5λ inter-element spacing) linear receiving (RX) array with 8 elements is nested between the 4 TX, which forms a transmitting (TX) array. The virtual aperture of the array configuration in accordance with the first embodiment of the present disclosure is shown in FIG. 2(*b*).

Specifically, the location of the l$^{th}$ RX is given as follows:

$$x_l^R = 0,\ y_l^R = -\frac{\lambda}{4}(L_R - 1) + \frac{l\lambda}{2},\ z_l^R = 0 \text{ for } l = 0, 1, \ldots, L_R - 1.$$

Specifically, the locations of the 4 TX are given as follows.

$$\begin{cases} x_0^T = 0,\ y_0^T = -\frac{\lambda}{4}L_R,\ z_0^T = \frac{d_z}{2} \\ x_1^T = 0,\ y_1^T = -\frac{\lambda}{4}L_R,\ z_1^T = -\frac{d_z}{2} \\ x_2^T = 0,\ y_2^T = \frac{\lambda}{4}L_R,\ z_2^T = \frac{d_z}{2} \\ x_3^T = 0,\ y_3^T = \frac{\lambda}{4}L_R,\ z_3^T = -\frac{d_z}{2} \end{cases}$$

In the first embodiment of the present disclosure, $d_z$ is set as λ for simplicity. To obtain the maximized uniform virtual array along the y axis, the inter-element spacing of the transmitting (TX) array is set as $$\frac{\lambda}{2}L_R$$

in the y direction. To extract the target information along the z axis, the vertical inter-element spacing of the transmitting (TX) array is set as $d_z$. As shown in FIG. 2(*b*), the array configuration in accordance with the first embodiment of the present disclosure forms two parallel uniform linear virtual apertures with vertical offset $d_z$. The location of the virtual array, for $n_1$=0, 1, . . . , $n_2$=0, 1, . . . , $2L_R$ is given as follows.

$$x_{(n_1,n_2)}^V = 0,\ y_{(n_1,n_2)}^V = -\frac{\lambda}{4}(2L_R - 1) + \frac{n_2\lambda}{2},\ z_{(n_1,n_2)}^V = -\frac{d_z}{2} + n_1d_z$$

For sensing usage, the range-azimuth angle resolution cell obtained by the array configuration in accordance with the first embodiment of the present disclosure depends on the bandwidth of transmitted signal as well as the horizontal length of the virtual array. The height information of the target can be obtained by the interferometry between the two vertically displaced virtual apertures.

Assume that the bandwidth of the transmitted signal is B. The slant range resolution is $$\Delta_R = \frac{c}{2B}.$$

The horizontal length of the virtual aperture is resolution is $$L = \frac{2L_R\lambda}{2} = L_R\lambda.$$

The azimuth resolution is $$\Delta_{cos\varphi sin\theta} = \frac{\lambda}{L} = \frac{1}{L_R}.$$

To extract the 3-D target information for sensing usage, (R, cos φ sin θ) is estimated by using the 2-D spectral estimation algorithm, such as 2D FFT, 2D CLEAN, etc. Then, the height z of the target at the range-azimuth cell (R, cos φ sin θ) can be determined by using the estimated range and azimuth information as well as the phase difference between two horizontal virtual apertures at this resolution cell. The relationship between the phase difference and height is as follows.

$$\frac{2\pi d_z z}{R\lambda} = \eta$$

Since the phase difference η is a modulo of 2π, the maximum unambiguous height is as follows.

$$\left|\frac{2\pi d_z(z_{max} - z_{min})}{R\lambda}\right| < 2\pi$$

The smaller $d_z$ is, the larger the maximum unambiguous height is. In addition, the array configuration in accordance with the first embodiment of the present disclosure cannot distinguish scatters located at the same range-azimuth cell with different heights. In other words, when there are two scatters located at (R, cos φ sin θ) with different heights, i.e. $z_1 \neq z_2$, the phase difference will be a hybrid result. Accordingly, it is assumed that no scatters located at the same range-azimuth cell with different heights in accordance with the first embodiment of the present disclosure (e.g., used for terrain estimation).

Figure 3A:
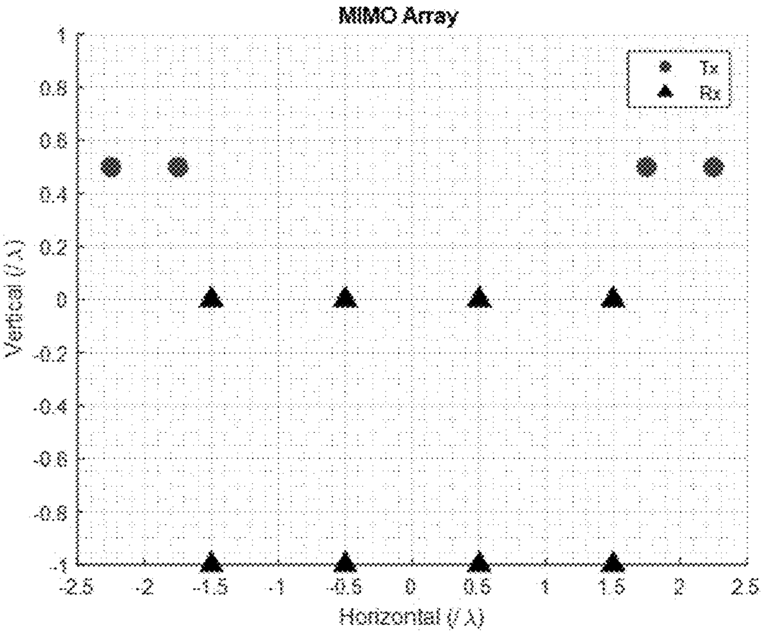
FIG. 3(*a*) illustrates an array configuration used for joint communication and sensing in accordance with a second embodiment of the present disclosure.
Figure 3B:
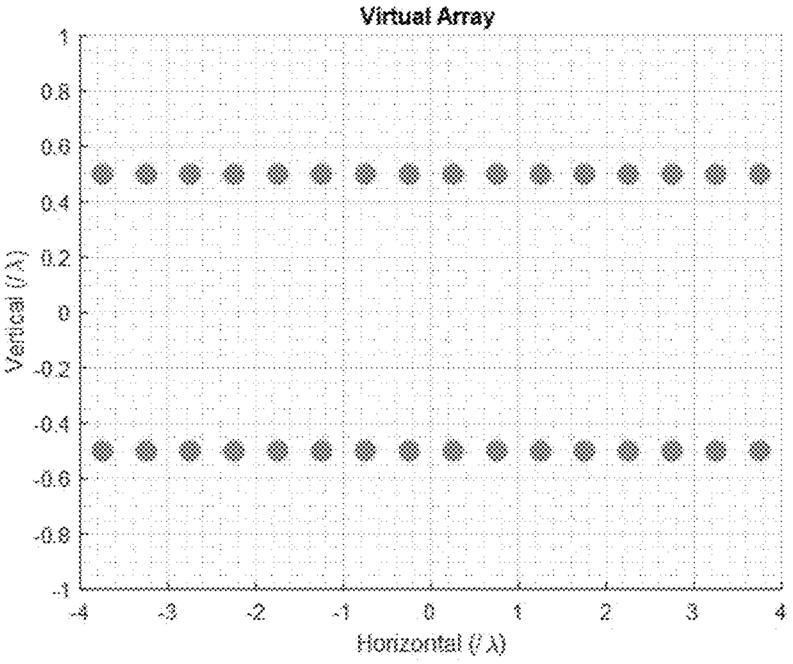

Now refer to FIG. 3(*a*), illustrating an array configuration used for joint communication and sensing in accordance with a second embodiment of the present disclosure.

The array configuration in accordance with the second embodiment of the present disclosure has 4 TX (i.e. $M_T$=4) and 8 RX (i.e. $L_R$=8), where two vertically displaced and sparsely separated receiving (RX) arrays with $L_R/2$ ($L_R$ should be even) elements and inter-element spacing λ for each receiving (RX) array and two groups of 2-element TX with inter-element spacing λ/2 are deployed above the two ends of the two receiving (RX) arrays. The virtual aperture of the array configuration in accordance with the second embodiment of the present disclosure is shown in FIG. 3(*b*).

Specifically, the location of the $l^{th}$ RX antenna is given as follows.

$$x_l^R = 0,\ y_l^R = -\frac{\lambda}{4}(L_R - 2) + \text{mod}\left(l, \frac{L_R}{2}\right)\lambda,\ z_l^R = z_0 + \text{mod}\left(l, \frac{L_R}{2}\right)d_z \text{ for } l = 0, 1, \ldots, L_R - 1.$$

Specifically, the locations of the 4 TX are given as follows.

$$\begin{cases} x_0^T = 0,\ y_0^T = -\frac{9\lambda}{4}L_R,\ z_0^T = -\frac{\lambda}{2} - z_0 \\ x_1^T = 0,\ y_1^T = -\frac{7\lambda}{4}L_R,\ z_1^T = -\frac{\lambda}{2} - z_0 \\ x_2^T = 0,\ y_2^T = \frac{7\lambda}{4}L_R,\ z_2^T = -\frac{\lambda}{2} - z_0 \\ x_3^T = 0,\ y_3^T = \frac{9\lambda}{4}L_R,\ z_3^T = -\frac{\lambda}{2} - z_0 \end{cases}$$

For simplicity, $z_0$ is set as −λ and $d_z$ is set as λ in accordance with the second embodiment of the present disclosure. The array configuration in accordance with the second embodiment of the present disclosure and that in accordance with the first embodiment of the present disclosure have a similar physical size and thus form the same virtual aperture, which means they have the same sensing capability and performance. The main difference between them is that the array configuration in accordance with the second embodiment of the present disclosure could provide a height estimation with data from only one TX.

Figure 4A:
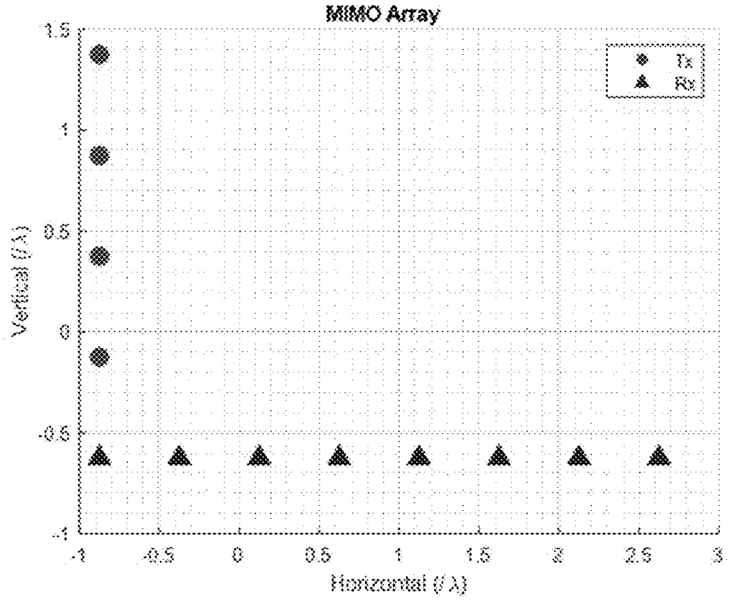
FIG. 4(*a*) illustrates an array configuration used for joint communication and sensing in accordance with a third embodiment of the present disclosure.
Figure 4B:
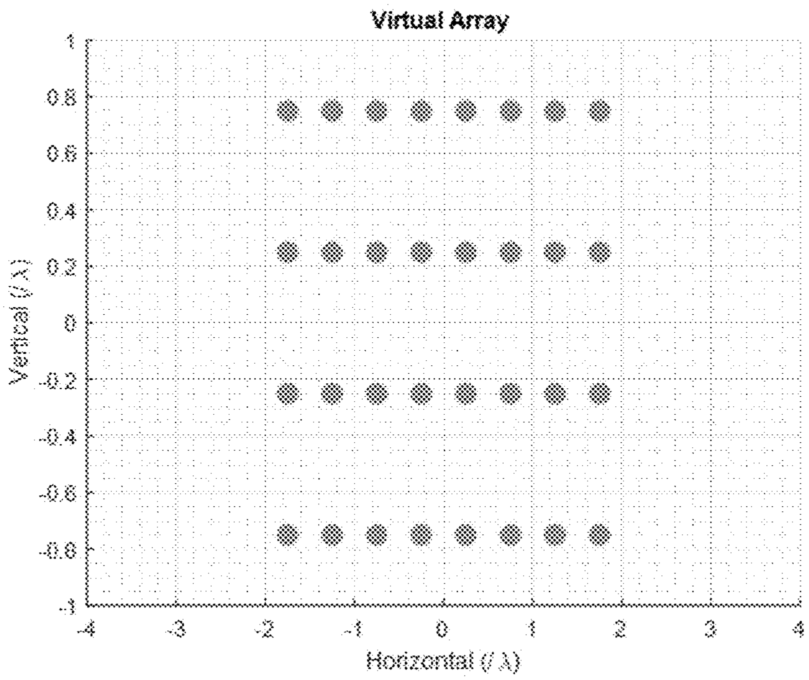

Now refer to FIG. 4(*a*), illustrating an array configuration used for joint communication and sensing in accordance with a third embodiment of the present disclosure.

The array configuration in accordance with the third embodiment of the present disclosure has 4 TX (i.e. $M_T$=4) and 8 RX (i.e. $L_R$=8), where a vertical uniform filled transmitting (TX) array having 4 TX and a horizontal uniform filled receiving (RX) array having $L_R$ RX are deployed. The virtual aperture of the array configuration in accordance with the third embodiment of the present disclosure is shown in FIG. 4(*b*).

Specifically, the location of the $l^{th}$ RX is given as follows.

$$x_l^R = 0,\ y_l^R = y_0 + \frac{l\lambda}{2},\ z_l^R = z_0 \text{ for } l = 0, 1, \ldots, L_R - 1.$$

Specifically, the location of the $m^{th}$ TX is given as follows.

$$x_m^T = 0,\ y_m^T = -\frac{\lambda}{4}(L_R - 1) - y_0,\ z_m^T = -\frac{3}{4}\lambda + \frac{m\lambda}{2} - z_0 \text{ for } m = 0, 1, \ldots, M_T - 1.$$

An $M_T \times L_R$ 2-D uniform virtual receiving array (FIG. 4(*b*)) could be obtained via the spatial convolution of the transmitting (TX) array and the receiving (RX) array. The location of the $(m,l)^{th}$ virtual element of virtual receiving array for l=0, 1, . . . , $L_R$−1, and m=0, 1, . . . , $M_T$−1 is given as follows.

$$x_{m,l}^V = 0,\ y_{m,l}^V = -\frac{\lambda}{4}(L_R - 1) + \frac{l\lambda}{2},\ z_{m,l}^V = -\frac{3}{4}\lambda + \frac{m\lambda}{2}$$

Assume that the bandwidth of the transmitted signal is B. The slant range resolution is $$\Delta_R = \frac{c}{2B}.$$

The horizontal length of the virtual aperture is $$L_h = \frac{L_R\lambda}{2}.$$

The azimuth resolution is $$\Delta_{cos\varphi sin\theta} = \frac{\lambda}{L_h} = \frac{2}{L_R}.$$

The vertical length of the virtual aperture is $$L_v = \frac{M_T\lambda}{2}.$$

The resolution in elevation is $$\Delta_{sin\varphi} = \frac{\lambda}{L_v} = \frac{2}{M_T}.$$

For sensing usage, we could estimate (R, cos φ sin θ, sin q) of a potential target by using the 3-D spectral estimation algorithm, such as 3D FFT, 3D CLEAN, etc. Then, the Polar coordinate system can be transformed into the Cartesian coordinate system by using the aforementioned relationship.

It should be noted that, in order to avoid grating lobes in the y direction, inter-element spacing of each horizontal virtual arrays is set to λ/2 for the array configurations in accordance with the first and second embodiment of the present disclosure. In addition, in order to avoid grating lobes in both y and z directions, inter-element spacing of virtual arrays is set to λ/2 in the two directions for the array configuration in accordance with the third embodiment of the present disclosure.

Figure 5A:
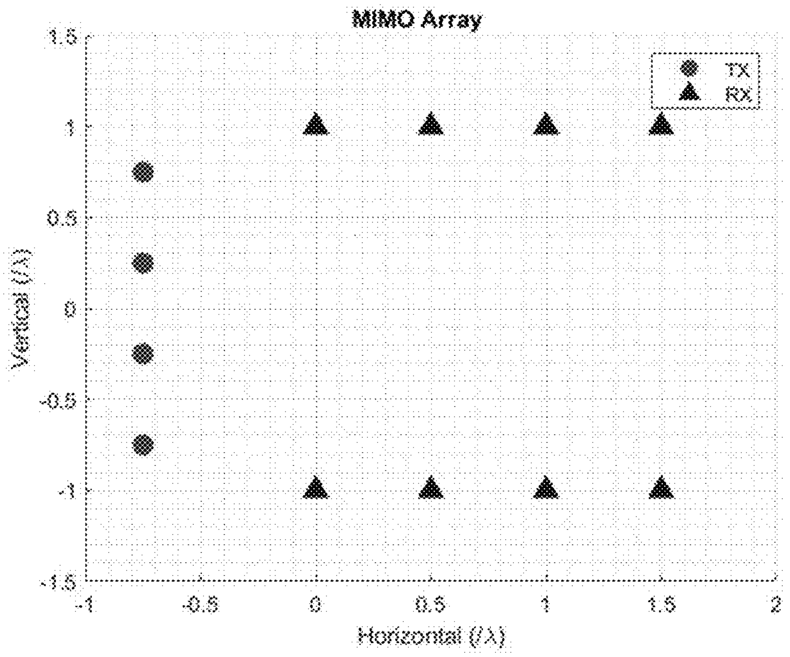
FIG. 5(*a*) illustrates an array configuration used for joint communication and sensing in accordance with a fourth embodiment of the present disclosure.
Figure 5B:
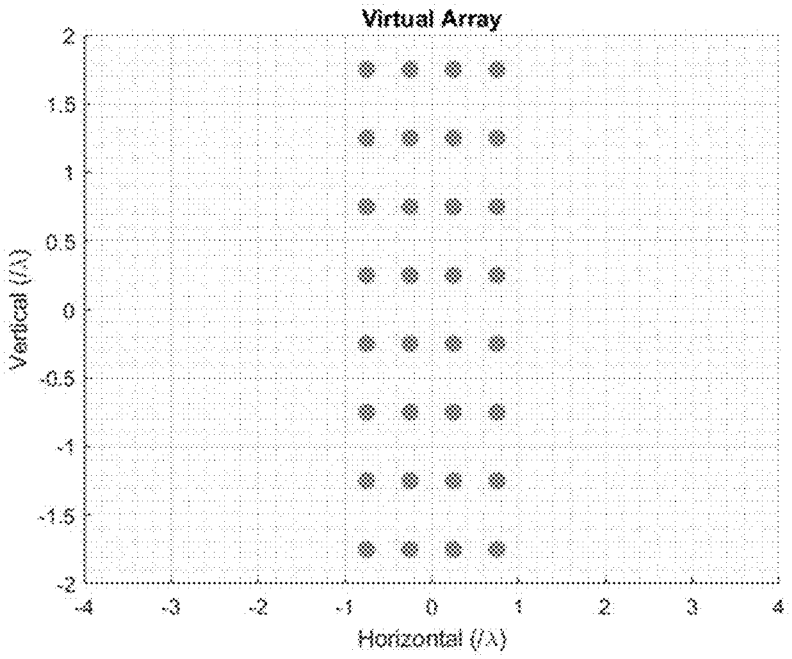

Now refer to FIG. 5(*a*), illustrating an array configuration used for joint communication and sensing in accordance with a fourth embodiment of the present disclosure.

The array configuration in accordance with the fourth embodiment of the present disclosure has 4 TX (i.e. $M_T$=4) and 8 RX (i.e. $L_R$=8), where two vertically displaced and sparsely separated receiving (RX) arrays with $L_R$/2 ($L_R$ should be even) elements and inter-element spacing λ for each receiving (RX) array and a vertical uniform filled transmitting (TX) array having 4 TX with inter-element spacing λ/2 are deployed. The transmitting (TX) array is located beside one end of each receiving (RX) array. The virtual aperture of the array configuration in accordance with the third embodiment of the present disclosure is shown in FIG. 5(*b*).

Specifically, the location of the $l^{th}$ RX is given as follows.

$$x_l^R = 0,\ y_l^R = y_0 + \frac{\mathrm{mod}\left(l, \frac{L_R}{2}\right)}{2},\ z_l^R = z_0 + 2\ \mathrm{floor}\left(\frac{l}{\frac{L_R}{2}}\right)\lambda$$

for $l = 0, 1, \ldots, L_R - 1$.

Specifically, the location of the $m^{th}$ TX is given as follows.

$$x_m^T = 0,\ y_m^T = -\frac{\lambda}{4}\left(\frac{L_R}{2} - 1\right) - y_0,\ z_m^T = -\frac{7}{4}\lambda + \frac{m\lambda}{2} - z_0$$

for $m = 0, 1, \ldots, M_T - 1$.

A $$2M_T x \frac{L_R}{2}$$

2-D uniform virtual receiving array (FIG. 5(*b*)) could be obtained via the spatial convolution of the transmitting (TX) array and the receiving (RX) array.

The location of the $(m,l)^{th}$ virtual element for l=0, 1, . . . , $$\frac{L_R}{2} - 1,$$

and m=0, 1, . . . , $2M_T-1$ is given as follows.

$$x_{m,l}^V = 0,\ y_{m,l}^V = -\frac{\lambda}{4}\left(\frac{L_R}{2} - 1\right) + \frac{l\lambda}{2},\ z_{m,l}^V = -\frac{7}{4}\lambda + \frac{m\lambda}{2}$$

Assume that the bandwidth of the transmitted signal is B. The slant range resolution is $$\Delta_R = \frac{c}{2B}.$$

The horizontal length of the virtual aperture is $$L_h = \frac{L_R\lambda}{4}.$$

The azimuth resolution is $$\Delta_{cos\varphi sin\theta} = \frac{\lambda}{L_h} = \frac{4}{L_R}.$$

The vertical length of the virtual aperture is $L_v=M_T\lambda$. The resolution in elevation is $$\Delta_{sin\varphi} = \frac{\lambda}{L_v} = \frac{1}{M_T}.$$

For sensing usage through, we could estimate (R, cos φ sin θ, sin q) of a potential target by using the 3-D spectral estimation algorithm, such as 3D FFT, 3D CLEAN, 3D MUSIC etc. Then, the Polar coordinate system can be transformed into Cartesian coordinate system by using the aforementioned relationship.

Given the above, the Azimuth and Elevation resolution of the resolution cell in accordance with the first, second, third and fourth embodiment of the present disclosure is collectively listed in Cartesian coordinate system as follows. The 2-D virtual receiving array can be used to provide 3-D sensing information.

| Embodiment | Azimuth resolution ($\Delta_{cos\varphi sin\theta}$) | Elevation resolution ($\Delta_{sin\varphi}$) |
|---|---|---|
| $1^{st}$ | $\frac{1}{L_R}$ | the height information is obtained by using interferometry between |
| $2^{nd}$ | $\frac{1}{L_R}$ | two vertically displaced virtual apertures |
| $3^{rd}$ | $\frac{2}{L_R}$ | $\frac{1}{2}$ |
| $4^{th}$ | $\frac{4}{L_R}$ | $\frac{1}{4}$ |

In the first, second, third and fourth embodiment of the present disclosure, the transmitting (TX) antennas may be used to transmit orthogonal frequency-domain multiplexing (OFDM) signals. The transmitted OFDM signal at the $m^{th}$ TX is given as follows.

$$s_T(t) = s_m(t)e^{j2\pi f_c t} = \frac{1}{N}\sum_{k=0}^{N-1} S_m(k)e^{j(2\pi f_c f + k\Delta)t},$$

$$m = 0, 1, \cdots, M_T - 1 \text{ and } -T_{cp} \le t < T,$$

where N is the number of subcarriers, Δf is the spacing between the subcarriers, $S_m(k)$ is the data at the $k^{th}$ subcarrier, $$s_m(t) = \frac{1}{N}\sum\nolimits_{k=0}^{N-1} S_m(k)e^{jk\Delta ft},$$

$f_c$ is the carrier frequency, $$T = \frac{1}{\Delta f}$$

is the effective duration of the OFDM symbol, $T_{cp}$ is the length of cyclic prefix (CP), and $T+T_{cp}$ is the total length of each OFDM symbol.

Property of $s_m(t)$ is given as follows.

$$s_m(t) = s_m(t+T), \text{ for } -T_{cp} \le t < 0.$$

The echo signal received by the $l^{th}$ RX can be expressed as follows.

$$r_l(t) = \sum\nolimits_{m=0}^{M_T-1} a s_T(t - \tau_{ml}) + v(t),$$

where a is the reflection coefficient of the target and $$\tau_{ml} = \frac{R_{ml}}{c}$$

is the time delay.

It is assumed that $T_{ml} < T_{cp}$ and that the sampling rate is $$T_s = \frac{1}{N\Delta f}.$$

After demodulating the received echo signal to baseband, sampling and removing the CP for $0 \le t < T$, the preprocessed received echo signal is given as follows.

$$z_l(n) = \sum\nolimits_{m=0}^{M_T-1} a s_m(nT_s - \tau_{ml})e^{-j2\pi f_c \tau_{ml}} + v(n),\ n = 0, 1, \cdots, N-1.$$

Then, taking the N-Point DFT to $z_l(n)$, it is given as follows.

$$Z_l(k) = \sum_{m=0}^{M_T-1} a S_m(k)e^{-j2\pi\Delta fk\tau_{ml}}e^{-j2\pi f_c \tau_{ml}} + V(k)$$

In short, applying a phase rotation in the frequency domain is equivalent to applying a cyclic shift in the time domain. The frequency-domain phase rotation to TX is given as follows.

$$S_{m'}^*(k)Z_l(k) = \sum_{m=0}^{M_T-1} a S_{m'}^*(k)S_m(k)e^{-j2\pi\Delta fk\tau_{ml}}e^{-j2\pi f_c \tau_{ml}} + S_{m'}^*(k)V(k) =$$
$$a S_{m'}^*(k)S_{m'}(k)e^{-j2\pi\Delta fk\tau_{m'l}}e^{-j2\pi f_c \tau_{m'l}} +$$
$$\sum_{m=0, m\ne m'}^{M_T-1} a S_{m'}^*(k)S_m(k)e^{-j2\pi\Delta fk\tau_{ml}}e^{-j2\pi f_c \tau_{ml}} + S_{m'}^*(k)V(k)$$

where $S^*_{m'}(k)$ is the conjugate transpose of $S_m(k)$.

Let $$S_m = e^{j\frac{I_m 2\pi k}{M_T} + j\phi_m} S(k),$$

where $I = \{I_0, I_1, I_2, \ldots, I_{M_{T-1}}\}$ is a permutation of a set $\{0, 1, 2, \ldots, M_T-1\}$, and $\phi_m$ is a nominal phase at TX element m. For example, in the case of 4 TX, I={0, 1, 2, 3} can be {0, π/2, π, 3π/ 2}. The TX-varying phase $\phi_m$ can be used as a design variable to achieve desired frequency response at the specified communication direction. In the first, second, third and fourth embodiment of the present disclosure, $M_T=4$, so the frequency-domain phase rotation to each TX is given as follows.

$$S_0^*(k)Z_l(k) =$$

$$aS*(k)S(k)\Big(e^{-j2\pi f_c\tau_{0l}}e^{-j2\pi\Delta fk\tau_{0l}} + e^{-j2\pi f_c\tau_{1l}+j(\phi_1-\phi_0)}e^{-j2\pi k\left(\Delta f\tau_{1l}+\frac{I_0-I_1}{4}\right)} +$$
$$e^{-j2\pi f_c\tau_{2l}+j(\phi_2-\phi_0)}e^{-j2\pi k\left(\Delta f\tau_{2l}+\frac{I_0-I_2}{4}\right)} +$$
$$e^{-j2\pi f_c\tau_{3l}+j(\phi_3-\phi_0)}e^{-j2\pi k\left(\Delta f\tau_{3l}+\frac{I_0-I_3}{4}\right)}\Big) + e^{-j\frac{I_0 2\pi k}{M_T}-j\phi_0}S*(k)V(k)$$

$$S_1^*(k)Z_l(k) =$$

$$aS*(k)S(k)\Big(e^{-j2\pi f_c\tau_{1l}}e^{-j2\pi\Delta fk\tau_{1l}} + e^{-j2\pi f_c\tau_{0l}+j(\phi_0-\phi_1)}e^{-j2\pi k\left(\Delta f\tau_{0l}+\frac{I_1-I_0}{4}\right)} +$$
$$e^{-j2\pi f_c\tau_{2l}+j(\phi_2-\phi_1)}e^{-j2\pi k\left(\Delta f\tau_{2l}+\frac{I_1-I_2}{4}\right)} +$$
$$e^{-j2\pi f_c\tau_{3l}+j(\phi_3-\phi_1)}e^{-j2\pi k\left(\Delta f\tau_{3l}+\frac{I_1-I_3}{4}\right)}\Big) + e^{-j\frac{I_1 2\pi k}{M_T}-j\phi_1}S*(k)V(k)$$

$$S_2^*(k)Z_l(k) =$$

$$aS*(k)S(k)\Big(e^{-j2\pi f_c\tau_{2l}}e^{-j2\pi\Delta fk\tau_{2l}} + e^{-j2\pi f_c\tau_{0l}+j(\phi_0-\phi_2)}e^{-j2\pi k\left(\Delta f\tau_{0l}+\frac{I_2-I_0}{4}\right)} +$$
$$e^{-j2\pi f_c\tau_{1l}+j(\phi_1-\phi_2)}e^{-j2\pi k\left(\Delta f\tau_{1l}+\frac{I_2-I_1}{4}\right)} +$$
$$e^{-j2\pi f_c\tau_{3l}+j(\phi_3-\phi_2)}e^{-j2\pi k\left(\Delta f\tau_{3l}+\frac{I_2-I_3}{4}\right)}\Big) + e^{-j\frac{I_2 2\pi k}{M_T}-j\phi_2}S*(k)V(k)$$

$$S_3^*(k)Z_l(k) =$$

$$aS*(k)S(k)\Big(e^{-j2\pi f_c\tau_{3l}}e^{-j2\pi\Delta fk\tau_{3l}} + e^{-j2\pi f_c\tau_{0l}+j(\phi_0-\phi_3)}e^{-j2\pi k\left(\Delta f\tau_{0l}+\frac{I_3-I_0}{4}\right)} +$$
$$e^{-j2\pi f_c\tau_{1l}+j(\phi_1-\phi_3)}e^{-j2\pi k\left(\Delta f\tau_{1l}+\frac{I_3-I_1}{4}\right)} +$$
$$e^{-j2\pi f_c\tau_{2l}+j(\phi_2-\phi_3)}e^{-j2\pi k\left(\Delta f\tau_{3l}+\frac{I_3-I_2}{4}\right)}\Big) + e^{-j\frac{I_3 2\pi k}{M_T}-j\phi_3}S*(k)V(k)$$

For constant amplitude waveform ($|S_m(k)|=1$), the frequency-domain phase rotation to each TX is given as follows.

$$S_0^*(k)Z_l(k) = a\Big(e^{-j2\pi f_c\tau_{0l}}e^{-j2\pi\Delta fk\tau_{0l}} + e^{-j2\pi f_c\tau_{1l}+j(\phi_1-\phi_0)}e^{-j2\pi k\left(\Delta f\tau_{1l}+\frac{I_0-I_1}{4}\right)} +$$
$$e^{-j2\pi f_c\tau_{2l}+j(\phi_2-\phi_0)}e^{-j2\pi k\left(\Delta f\tau_{2l}+\frac{I_0-I_2}{4}\right)} +$$
$$e^{-j2\pi f_c\tau_{3l}+j(\phi_3-\phi_0)}e^{-j2\pi k\left(\Delta f\tau_{3l}+\frac{I_o-I_3}{4}\right)}\Big) + e^{-j\frac{I_0 2\pi k}{M_T}-j\phi_0}S*(k)V(k)$$

$$S_1^*(k)Z_l(k) =$$

$$a\Big(e^{-j2\pi f_c\tau_{1l}}e^{-j2\pi\Delta fk\tau_{1l}} + e^{-j2\pi f_c\tau_{0l}+j(\phi_0-\phi_1)}e^{-j2\pi k\left(\Delta f\tau_{0l}+\frac{I_1-I_0}{4}\right)} +$$
$$e^{-j2\pi f_c\tau_{2l}+j(\phi_2-\phi_1)}e^{-j2\pi k\left(\Delta f\tau_{2l}+\frac{I_1-I_2}{4}\right)} +$$
$$e^{-j2\pi f_c\tau_{3l}+j(\phi_3-\phi_1)}e^{-j2\pi k\left(\Delta f\tau_{3l}+\frac{I_1-I_3}{4}\right)}\Big) + e^{-j\frac{I_1 2\pi k}{M_T}-j\phi_1}S*(k)V(k)$$

$$S_2^*(k)Z_l(k) =$$

$$a\Big(e^{-j2\pi f_c\tau_{2l}}e^{-j2\pi\Delta fk\tau_{2l}} + e^{-j2\pi f_c\tau_{0l}+j(\phi_0-\phi_2)}e^{-j2\pi k\left(\Delta f\tau_{0l}+\frac{I_2-I_0}{4}\right)} +$$
$$e^{-j2\pi f_c\tau_{1l}+j(\phi_1-\phi_2)}e^{-j2\pi k\left(\Delta f\tau_{1l}+\frac{I_2-I_1}{4}\right)} +$$
$$e^{-j2\pi f_c\tau_{3l}+j(\phi_3-\phi_2)}e^{-j2\pi k\left(\Delta f\tau_{3l}+\frac{I_2-I_3}{4}\right)}\Big) + e^{-j\frac{I_2 2\pi k}{M_T}-j\phi_2}S*(k)V(k)$$

$$S_3^*(k)Z_l(k) =$$

$$a\Big(e^{-j2\pi f_c\tau_{3l}}e^{-j2\pi\Delta fk\tau_{3l}} + e^{-j2\pi f_c\tau_{0l}+j(\phi_0-\phi_3)}e^{-j2\pi k\left(\Delta f\tau_{0l}+\frac{I_3-I_0}{4}\right)} +$$
$$e^{-j2\pi f_c\tau_{1l}+j(\phi_1-\phi_3)}e^{-j2\pi k\left(\Delta f\tau_{1l}+\frac{I_3-I_1}{4}\right)} +$$

-continued $$e^{-j2\pi f_c\tau_{2l}+j(\phi_2-\phi_3)}e^{-j2\pi k\left(\Delta f\tau_{3l}+\frac{I_3-I_2}{4}\right)}\Big) + e^{-j\frac{I_3 2\pi k}{M_T}-j\phi_3}S*(k)V(k)$$

At the IFFT spectrum of $S^*_0(k)Z_l(k)$, i.e., $\hat{s}_0(t)=\text{IFFT}(S^*_0(k)Z_l(k))$, there are four peaks in the time domain. The peak locations are $\tau_{0l}$, $$\tau_{1l} + \frac{T}{4}(I_0 - I_1),\ \tau_{2l} + \frac{T}{4}(I_0 - I_2),\ \tau_{3l} + \frac{T}{4}(I_0 - I_3).$$

At the IFFT spectrum of $S^*_1(k)Z_l(k)$, i.e., $\hat{s}_1(t)=\text{IFFT}(S^*_1(k)Z_l(k))$, there are four peaks in the time domain. The peak locations are $\tau_{1l}$, $$\tau_{0l} + \frac{T}{4}(I_1 - I_0),\ \tau_{2l} + \frac{T}{4}(I_1 - I_2),\ \tau_{3l} + \frac{T}{4}(I_1 - I_3).$$

At the IFFT spectrum of $S^*_2(k)Z_l(k)$, i.e., $\hat{s}_2(t)=\text{IFFT}(S^*_2(k)Z_l(k))$, there are four peaks in the time domain. The peak locations are $\tau_{2l}$, $$\tau_{0l} + \frac{T}{4}(I_2 - I_0),\ \tau_{1l} + \frac{T}{4}(I_2 - I_1),\ \tau_{3l} + \frac{T}{4}(I_2 - I_3).$$

At the IFFT spectrum of $S^*_3(k)Z_l(k)$, i.e., $\hat{s}_3(t)=\text{IFFT}(S^*_3(k)Z_l(k))$, there are four peaks in the time domain. The peak locations are $\tau_{3l}$, $$\tau_{0l} + \frac{T}{4}(I_3 - I_0),\ \tau_{1l} + \frac{T}{4}(I_3 - I_1),\ \tau_{2l} + \frac{T}{4}(I_3 - I_2).$$

Let $$\hat{s}_m(t) = \begin{cases} \hat{s}_m(t), & t \in \left[0, \frac{T}{4}\right] \\ 0, & t \in \left[\frac{T}{4}, T\right] \end{cases}.$$

The echo signals from different TXs could be separated at the receiver. $\hat{s}_m(t)$ could be used for further azimuth compression in radar imaging.

In addition, the payload of the frequency-domain phase rotation to each TX is given as follows.

$$\frac{S_0^*(k)Z_l(k)}{|S_0(k)|^2} =$$

$$a\Big(e^{-j2\pi f_c\tau_{0l}}e^{-j2\pi\Delta fk\tau_{0l}} + e^{-j2\pi f_c\tau_{1l}+j(\phi_1-\phi_0)}e^{-j2\pi k\left(\Delta f\tau_{1l}+\frac{I_0-I_1}{4}\right)} +$$
$$e^{-j2\pi f_c\tau_{2l}+j(\phi_2-\phi_0)}e^{-j2\pi k\left(\Delta f\tau_{2l}+\frac{I_0-I_2}{4}\right)} +$$
$$e^{-j2\pi f_c\tau_{3l}+j(\phi_3-\phi_0)}e^{-j2\pi k\left(\Delta f\tau_{3l}+\frac{I_0-I_3}{4}\right)}\Big) + \frac{e^{-j\frac{I_0 2\pi k}{M_T}-j\phi_0}S*(k)V(k)}{|S_1(k)|^2}$$

$$\frac{S_1^*(k)Z_l(k)}{|S_1(k)|^2} = a\Big(e^{-j2\pi f_c\tau_{1l}}e^{-j2\pi\Delta fk\tau_{1l}} + e^{-j2\pi f_c\tau_{0l}+j(\phi_0-\phi_1)}e^{-j2\pi k\left(\Delta f\tau_{ol}+\frac{I_1-I_0}{4}\right)} +$$
$$e^{-j2\pi f_c\tau_{2l}+j(\phi_2-\phi_1)}e^{-j2\pi k\left(\Delta f\tau_{2l}+\frac{I_1-I_2}{4}\right)} +$$

-continued $$e^{-j2\pi f_c\tau_{3l}+j(\phi_3-\phi_1)}e^{-j2\pi k\left(\Delta f\tau_{3l}+\frac{I_1-I_3}{4}\right)}\Big)+\frac{e^{-j\frac{I_1 2\pi k}{M_T}-j\phi_1}S*(k)V(k)}{|S_2(k)|^2}$$

$$\frac{S_2^*(k)Z_l(k)}{|S_2(k)|^2}=$$

$$a\Big(e^{-j2\pi f_c\tau_{2l}}e^{-j2\pi\Delta fk\tau_{2l}}+e^{-j2\pi f_c\tau_{0l}+j(\phi_0-\phi_2)}e^{-j2\pi k\left(\Delta f\tau_{0l}+\frac{I_2-I_0}{4}\right)}+$$

$$e^{-j2\pi f_c\tau_{1l}+j(\phi_1-\phi_2)}e^{-j2\pi k\left(\Delta f\tau_{1l}+\frac{I_2-I_1}{4}\right)}+$$

$$e^{-j2\pi f_c\tau_{3l}+j(\phi_3-\phi_2)}e^{-j2\pi k\left(\Delta f\tau_{3l}+\frac{I_2-I_3}{4}\right)}\Big)+\frac{e^{-j\frac{I_2 2\pi k}{M_T}-j\phi_2}S*(k)V(k)}{|S_3(k)|^2}$$

$$\frac{S_3^*(k)Z_l(k)}{|S_3(k)|^2}=$$

$$a\Big(e^{-j2\pi f_c\tau_{3l}}e^{-j2\pi\Delta fk\tau_{3l}}+e^{-j2\pi f_c\tau_{0l}+j(\phi_0-\phi_3)}e^{-j2\pi k\left(\Delta f\tau_{ol}+\frac{I_3-I_0}{4}\right)}+$$

$$e^{-j2\pi f_c\tau_{1l}+j(\phi_1-\phi_3)}e^{-j2\pi k\left(\Delta f\tau_{1l}+\frac{I_3-I_1}{4}\right)}+$$

$$e^{-j2\pi f_c\tau_{2l}+j(\phi_2-\phi_3)}e^{-j2\pi k\left(\Delta f\tau_{3l}+\frac{I_3-I_2}{4}\right)}\Big)+\frac{e^{-j\frac{I_3 2\pi k}{M_T}-j\phi_3}S*(k)V(k)}{|S_4(k)|^2}$$

At the IFFT spectrum of $S^*_0(k)Z_l(k)/|S_0(k)|^2$, i.e., $\hat{\tilde{s}}_0(t)=\mathrm{IFFT}(S^*_0(k)Z_l(k)/|S_0(k)|^2)$, there are four peaks in the time domain. The peak locations are $\tau_{0l}$, $$\tau_{1l}+\frac{T}{4}(I_0-I_1),\ \tau_{2l}+\frac{T}{4}(I_0-I_2),\ \tau_{3l}+\frac{T}{4}(I_0-I_3).$$

At the IFFT spectrum of $S^*_1(k)Z_l(k)/|S_1(k)|^2$, i.e., $\hat{\tilde{s}}_1(t)=\mathrm{IFFT}(S^*_1(k)Z_l(k)/|S_1(k)|^2)$, there are four peaks in the time domain. The peak locations are $\tau_{1l}$, $$\tau_{0l}+\frac{T}{4}(I_1-I_0),\ \tau_{2l}+\frac{T}{4}(I_1-I_2),\ \tau_{3l}+\frac{T}{4}(I_1-I_3).$$

At the IFFT spectrum of $S^*_2(k)Z_l(k)/|S_2(k)|^2$, i.e., $\hat{\tilde{s}}_2(t)=\mathrm{IFFT}(S^*_2(k)Z_l(k)/|S_2(k)|^2)$, there are four peaks in the time domain. The peak locations are $\tau_{2l}$, $$\tau_{0l}+\frac{T}{4}(I_2-I_0),\ \tau_{1l}+\frac{T}{4}(I_2-I_1),\ \tau_{3l}+\frac{T}{4}(I_2-I_3).$$

At the IFFT spectrum of $S^*_3(k)Z_l(k)/|S_3(k)|^2$, i.e., $\hat{\tilde{s}}_3(t)=\mathrm{IFFT}(S^*_3(k)Z_l(k)/|S_3(k)|^2)$, there are four peaks in the time domain. The peak locations are $\tau_{3l}$, $$\tau_{0l}+\frac{T}{4}(I_3-I_0),\ \tau_{1l}+\frac{T}{4}(I_3-I_1),\ \tau_{2l}+\frac{T}{4}(I_3-I_2).$$

Let $$\hat{s}_m(t)=\begin{cases}\hat{\tilde{s}}_m(t),\ t\in\left[0,\frac{T}{4}\right]\\ 0,\ t\in\left[\frac{T}{4},T\right]\end{cases}.$$

The echo signals from different TXs could be separated at the receiver. $\hat{s}_m(t)$ could be used for further azimuth compression in radar imaging.

With the different cyclic shifts applied to different TX, the array configurations in accordance with the first, second, third and fourth embodiment of the present disclosure as shown in FIGS. 2(*a*) to 5(*a*) can augment the receiving (RX) array of $$L_R\left(1\times L_R\text{ or }2\times\frac{L_R}{2}\right)$$

into a virtual receiving array of $4L_R$ ($2\times 2L_R$ or $4\times L_R$). Specifically, the 8 RX ($L_R$ is illustrated as eight in the first, second, third and fourth embodiments of the present disclosure) as shown in FIGS. 2(*a*) to 5(*a*) augmented to be 32 virtual RX as shown in FIGS. 2(*b*) to 5(*b*). As long as the signal from each TX at $$(x_m^T, y_m^T, z_m^T),\ m=0,1,\ldots,M_T-1$$

m=0, 1, . . . , $M_T-1$ is resolvable for RX at $$(x_l^R, y_l^R, z_l^R),\ l=0,1,\ldots,N_R-1,$$

l=0, 1, . . . , $N_R-1$, virtual receiving array can be obtained for sensing resolution enhancement.

As mentioned above, the TX-varying phase $\phi_m$ due to cyclic shift in time domain can be used as a design variable to achieve desired frequency response at the specified communication direction.

In order to establish the communication channel modeling, a uniform linear array (ULA) TXs and ULA RXs is used, where $M_T=4$ and inter-element spacing d, for instance. It should be noted that the array configurations in accordance with the first, second, third and fourth embodiments of the present disclosure as shown in FIGS. 2(*a*) to 5(*a*) can be considered as combinations of ULA TXs and ULA RXs. The transmitted signal at the $m^{th}$ TX is given as follows.

$$s_m^c(r)=s_m(t)e^{j2\pi f_c t}=\frac{1}{N}\sum_{k=0}^{N-1}S_m(k)e^{j(2\pi f_c+k\Delta f)t},$$

where $$s_m(t)=s\left(t+\frac{I_m}{4}T\right)$$

$$S_m(k)=e^{j\frac{I_m 2\pi k}{M_T}+j\phi_m}S(k)$$

After demodulation to baseband, CP removal and DFT operation, the received signal obtained by the $l^{th}$ RX is given as follows.

$$r_l(k)=\sum_{p=1}^{P}\tilde{\beta}_p e^{\frac{j2\pi d\sin\psi_p l}{\lambda}}\sum_{m=0}^{M_T-1}e^{-\frac{j2\pi d\sin\theta_p m}{\lambda}}S_m(k)=$$

$$\sum_{p=1}^{P}\tilde{\beta}_p e^{\frac{j2\pi d\sin\psi_p l}{\lambda}}\sum_{m=0}^{M_T-1}e^{-\frac{j2\pi d\sin\theta_p m}{\lambda}}e^{j\frac{I_m 2\pi k}{M_T}+j\phi_m}S(k),$$

where P is the number of paths, $\theta_p$, $\psi_p$ and $\tilde{\beta}_p$ are the angle of departure (AoD), angle of arrival (AoA), and path gain of the $p^{th}$ path.

For a specific RX, $$\beta_{p,l} = \tilde{\beta}_p e^{\frac{j2\pi d sin\psi_p l}{\lambda}},$$

where the subscript l is omitted, and then it becomes as follows.

$$r(i) = \sum_{p=1}^{P} \beta_p \sum_{m=0}^{M_T-1} e^{-\frac{j2\pi d sin\theta_p m}{\lambda}} e^{j\frac{I_m 2\pi k}{M_T}+j\phi_m} S(k).$$

For ULA TX with interelement spacing λ/2, it is given as follows.

$$r(k) = \sum_{p=1}^{P} \beta_p \sum_{m=0}^{M_T-1} e^{-j\pi \sin\theta_p m} e^{j\frac{I_m 2\pi k}{M_T}+j\phi_m} S(k).$$

Assume that the number of multipath P=1, it is given as follows.

$$r(k)=H_\theta(k)S(k),$$

with $$H_\theta = \sum_{m=0}^{M_T-1} e^{-j\pi sin\theta_p m} e^{j\frac{I_m 2\pi k}{M_T}+j\phi_m},$$

and $H_\theta(k)=H_\theta(k+M_T)$.

Now, the simulation results of different choices of $\{I_m\}$ and $\{\phi_m\}$ on $H_\theta(k)$ ($M_T=4$) are analyzed through the following cases.

Case 1: $I_m=m$, $\phi_m=0$, for m=0, 1, 2, 3, that is I={0 1 2 3} and Φ={0, 0, 0, 0}

$$r(k) = \sum_{m=0}^{M_T-1} e^{-j\pi m\left(sin\theta_p - \frac{mod(k,M_T)}{M_T/2}\right)} S(k) = \frac{1-e^{-j\pi M_T\left(sin\theta_p - \frac{mod(k,M_T)}{M_T/2}\right)}}{1-e^{-j\pi\left(sin\theta_p - \frac{mod(k,M_T)}{M_T/2}\right)}} S(k),$$

where $$H_\theta(k) = 1 - \frac{e^{-j\pi 4\left(sin\theta_p - \frac{mod(k,4)}{2}\right)}}{1-e^{-j\pi\left(sin\theta_p - \frac{mod(k,4)}{2}\right)}}$$

has peaks at $$\sin\theta_p = \frac{\text{mod}(k,4)}{2} + 2q,\ q = \left\{q \in \mathbb{N}, -1 \le \frac{\text{mod}(k,4)}{2} + 2q < 1\right\}.$$

For subcarrier=0, 4, 8, . . . , $$\sin\theta_p = \frac{\text{mod}(k,4)}{2} + 2q = 0,$$

the mainlobe of the beam pattern is located at $\theta_p=0$.

For subcarrier=1, 5, 9, . . . , $$\sin\theta_p = \frac{\text{mod}(k,4)}{2} + 2q = \frac{1}{2},$$

the mainlobe of the beam pattern is located at $\theta_p=30°$.

For subcarrier=2, 6, 8, . . . , $$\sin\theta_p = \frac{\text{mod}(k,4)}{2} + 2q = -1,$$

the mainlobe of the beam pattern is located at $\theta_p=90°, -90°$.

For subcarrier k=3, 7, 11, . . . , $$\sin\theta_p = \frac{\text{mod}(k,4)}{2} + 2q = -\frac{1}{2},$$

the mainlobe of the beam pattern is located at $\theta_p=-30°$.

Figure 6:
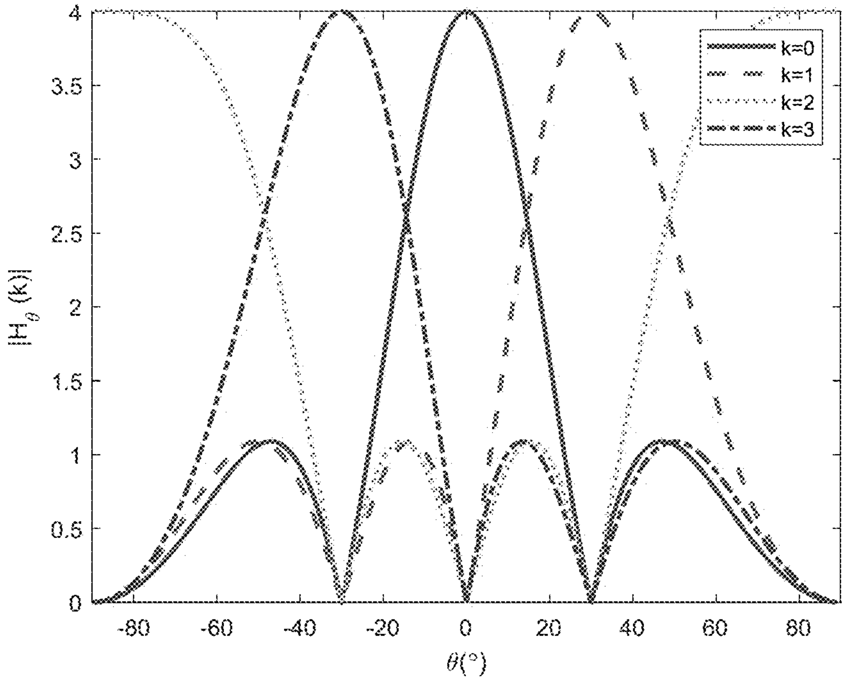
FIG. 6 illustrates the beam patterns of Case 1.

The beam patterns of Case 1 (cyclic-shift in time domain is applied, which means phase-shift in frequency domain is occurred, but no TX-varying phase rotation, i.e. precoder, is applied) for subcarriers are shown in FIG. 6, where the beam patterns are directed towards various angles, that means bad communication performance and sensing ability.

In contrast, to avoid frequency selectivity, TX-varying phase rotation (precoder) $\Phi=[\phi_0, \phi_1, \phi_2, \phi_3]$ for communication at the direction of $\theta_c$, i.e., $\theta_p \in (\theta_c-\Delta\theta, \theta_c+\Delta\theta)$ is added. For simplicity, it is assumed $\theta_c=0$. For selected $I=[I_0, I_1, I_2, I_3]$, $\Phi=[\phi_0, \phi_1, \phi_2, \phi_3]$, the communication performance is determined by using the following criterion:

$|H_\theta(k)|$ has the same value at Angle of Departure (AoD);

$\theta_c=0$ for k=0, 1, 2, 3, . . . ;

$|H_\theta(k)|$ is plotted;

the magnitude of effective frequency-domain response, and $$\frac{\min_k |H_\theta(k)|}{\max_k |H_\theta(k)|},$$

the angular frequency-domain flatness at AoD $\theta_p$ are considered;

the bit error rate is used to evaluate the performance.

Case 2: I={0 1 2 3}, Φ={0, π, 0, 0}

Figure 7:
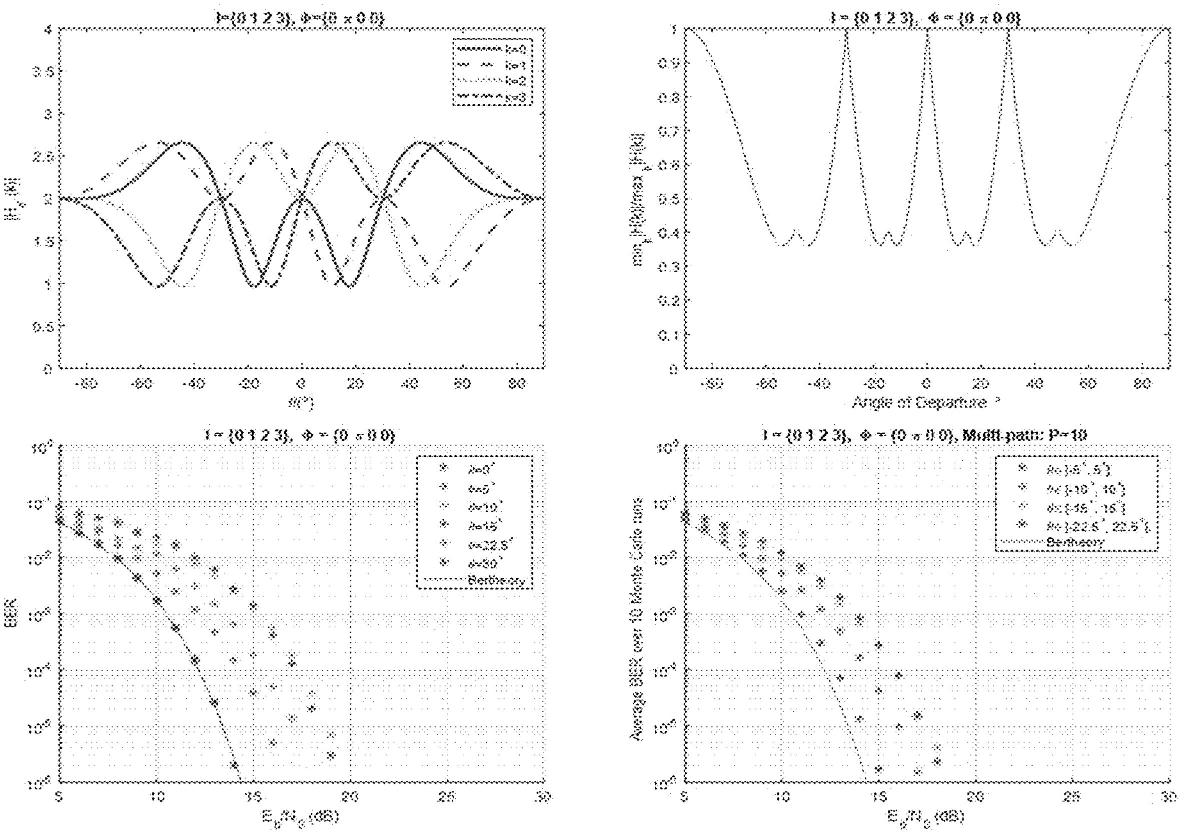
FIG. 7 illustrates the beam patterns, angle of departure and bit error rate of Case 2.

The beam patterns, angle of departure and bit error rate of Case 2 are plotted in FIG. 7 based on the aforementioned criterion.

Case 3: I={0 1 3 2}, Φ={0, π, 0, 0}

Figure 8:
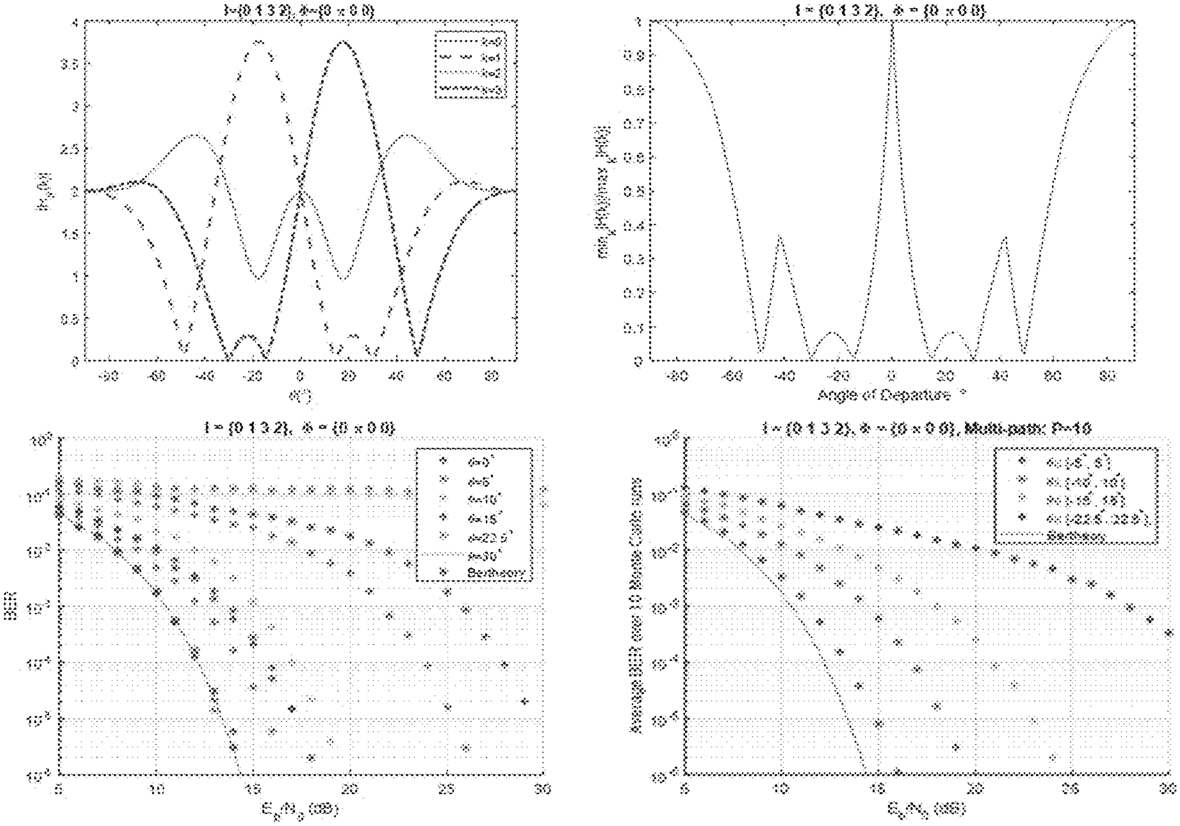
FIG. 8 illustrates the beam patterns, angle of departure and bit error rate of Case 3.

The beam patterns, angle of departure and bit error rate of Case 3 are plotted in FIG. 8 based on the aforementioned criterion.

Case 4: I={0 2 1 3}, Φ={0, 0, π, 0}

Figure 9:
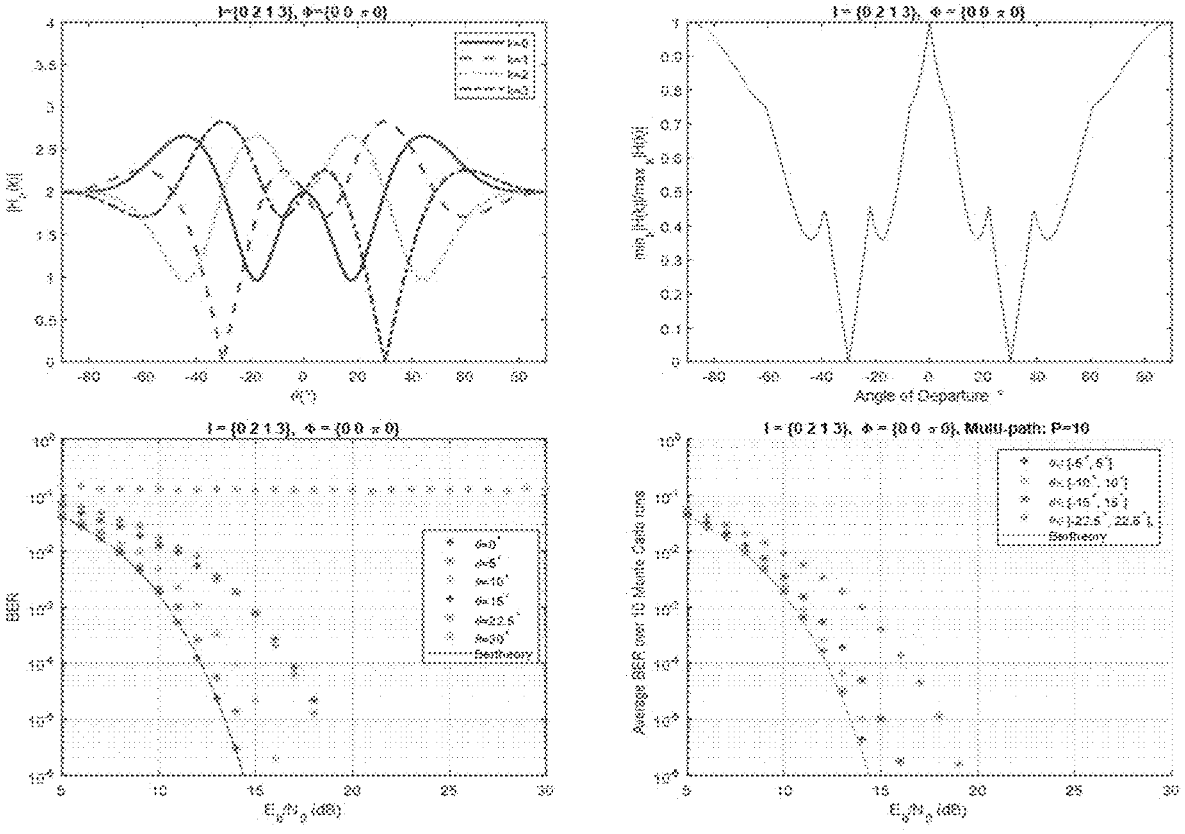
FIG. 9 illustrates the beam patterns, angle of departure and bit error rate of Case 4.

The beam patterns, angle of departure and bit error rate of Case 4 are plotted in FIG. 9 based on the aforementioned criterion.

Case 5: I={0 2 3 1}, Φ={0, 0, 0, π}

Figure 10:
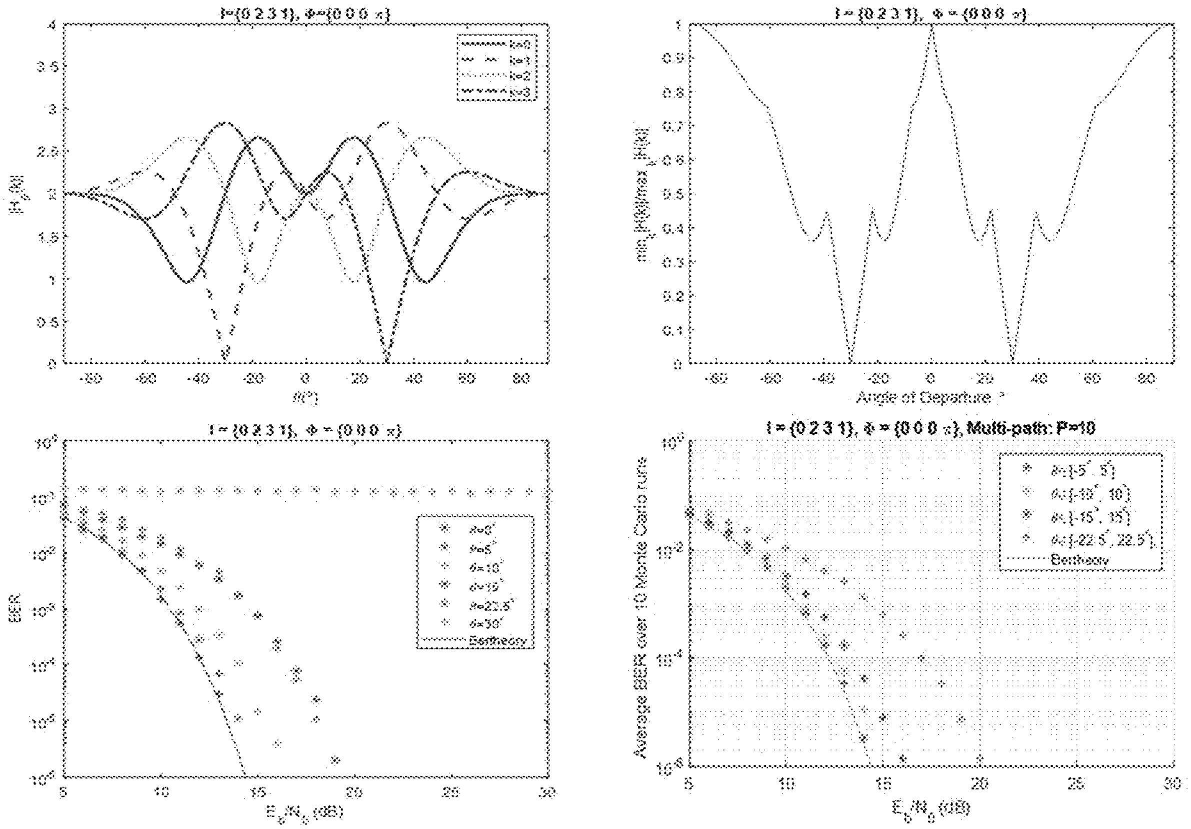
FIG. 10 illustrates the beam patterns, angle of departure and bit error rate of Case 5.

The beam patterns, angle of departure and bit error rate of Case 5 are plotted in FIG. 10 based on the aforementioned criterion.

Case 6: I={0 3 1 2}, Φ={0, 0, π, 0}

Figure 11:
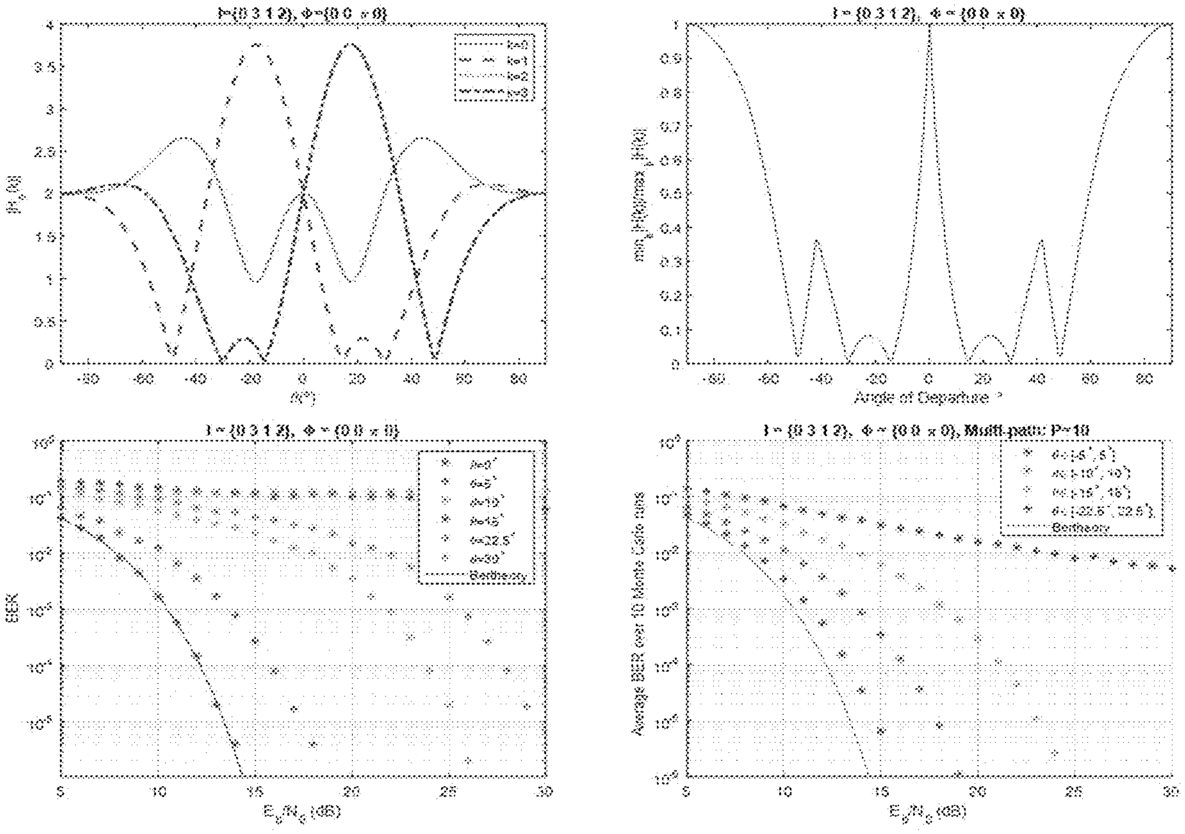
FIG. 11 illustrates the beam patterns, angle of departure and bit error rate of Case 6.

The beam patterns, angle of departure and bit error rate of Case 6 are plotted in FIG. 11 based on the aforementioned criterion.

Case 7: I={0 3 2 1}, Φ={0, 0, 0, π}

Figure 12:
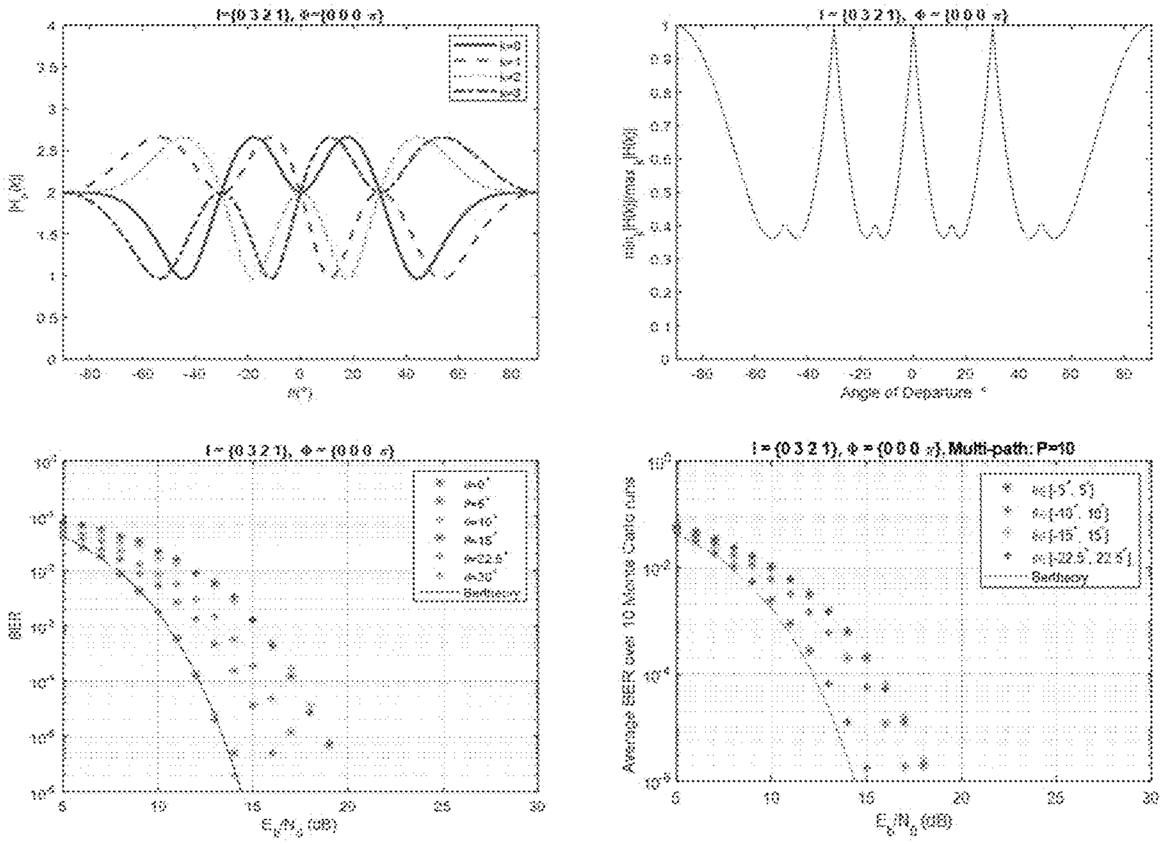
FIG. 12 illustrates the beam patterns, angle of departure and bit error rate of Case 7.

The beam patterns, AoD and bit error rate of Case 7 are plotted in FIG. 12 based on the aforementioned criterion.

Given the above, Case 2 and Case 7 have the characteristics that the angular frequency-domain flatness stays non-zero at any angle. That is, there is no risk of frequency nulls as the communication receiver's direction departs from the virtual array's Direction of Arrival (DOA), and therefore Case 2 and Case 7 have the minimum impact to the communication performance. Case 2 and Case 7 are monotonically increasing or decreasing phase sequence before modulo-2π.

When a communication receiver of a device, such as another UE or a gNB, selects a transmit precoder matrix index (TPMI), as in 5G system, and the phase vector of TPMI does not correspond to a single ULA wavefront, the virtual receiving array may choose a uniform linear phase vector of which the mainlobe direction aligns with that of the TPMI's phase vector to improve communication performance and sensing ability, such as Case 8 and Case 9.

$$\text{Case 8: } I = \{0\ 2\ 1\ 3\},\ \Phi = \left\{0, \frac{\pi}{2}, \frac{\pi}{2}, 0\right\}$$

Figure 13:
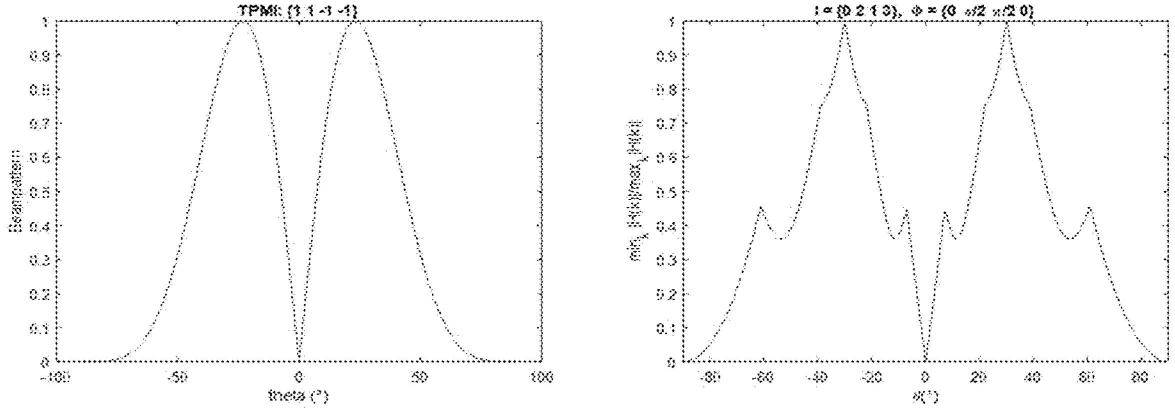
FIG. 13 illustrates the beam patterns of Case 8.

The beam patterns of Case 8 are plotted in FIG. 13. The mainlobe direction of the beam patterns of Case 8 aligns with that of TPMI's phase vector {1, 1, −1, −1}.

Case 9: I={0 2 1 3}, Φ={0, 3.0094, 1.3063, 1.1741}

Figure 14:
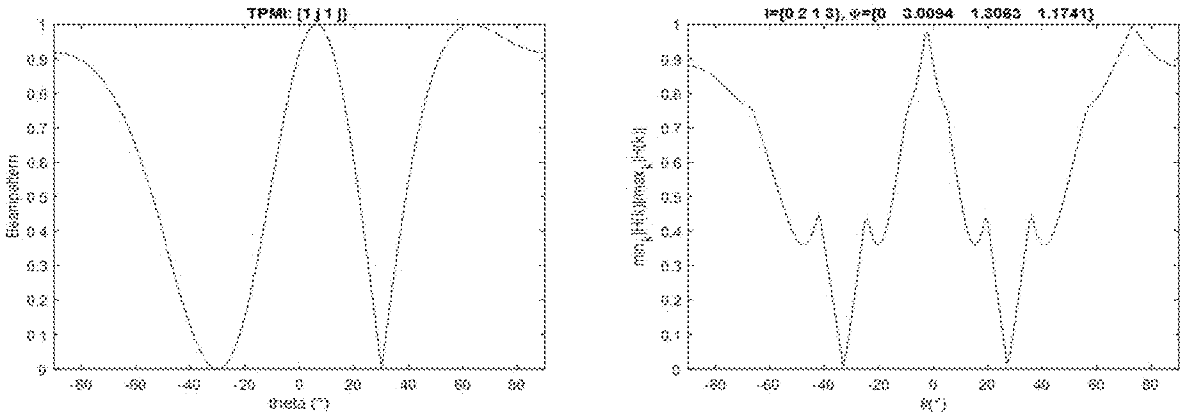
FIG. 14 illustrates the beam patterns of Case 9.

The beam patterns of Case 9 are plotted in FIG. 14. The mainlobe direction of the beam patterns of Case 9 aligns with that of TPMI's phase vector {1, j, 1, j}.

Figure 15:
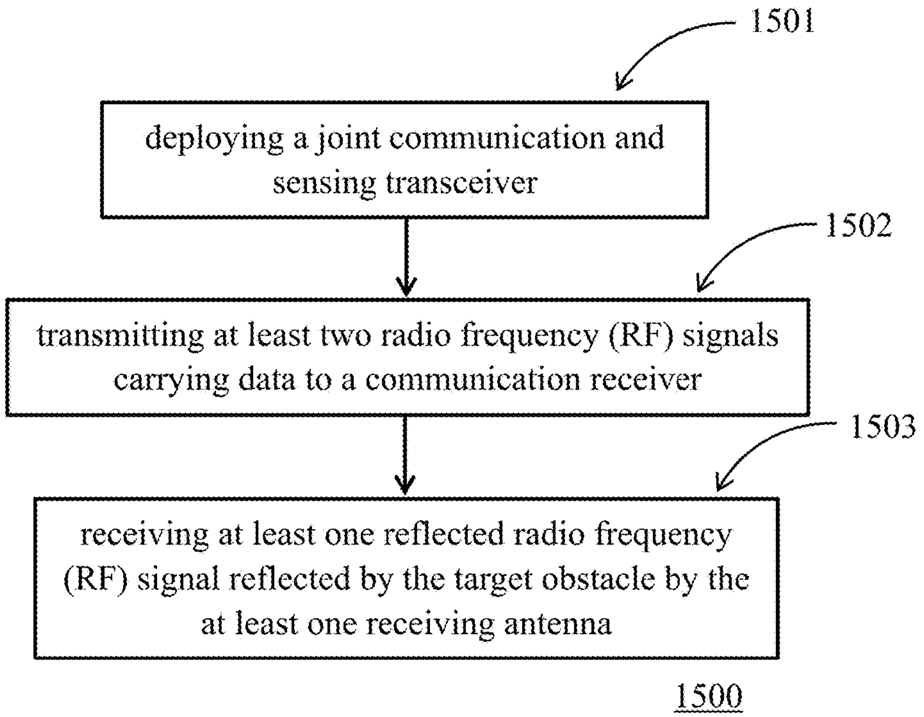
FIG. 15 illustrates a method of joint communication and sensing of a target obstacle (object or human) in accordance with a fifth embodiment of the present disclosure.

Now refer to FIG. 15 which illustrates a method (1500) of joint communication and sensing of a target obstacle (object or human) in accordance with a fifth embodiment of the present disclosure. The method (1500) comprises deploying a joint communication and sensing transceiver, comprising a transmitter (TX) having at least two transmitting antennas and a receiver (RX) having at least one receiving antenna (step 1501); transmitting at least two radio frequency (RF) signals carrying data to a communication receiver by the at least two transmitting antennas (step 1502); and receiving at least one reflected radio frequency (RF) signal reflected by the target obstacle by the at least one receiving antenna (step 1503).

In the step 1501, the at least two transmitting antennas and the at least one receiving antenna can be deployed in accordance with FIG. 2(*a*), FIG. 3(*a*), FIG. 4(*a*), FIG. 5(*a*), or other suitable arrangement. In addition, a virtual receiving array is generated based on the deployment of the transmitting antennas and the receiving antennas in accordance with FIG. 2(*a*), FIG. 3(*a*), FIG. 4(*a*), FIG. 5(*a*). The virtual receiving array can be referred to FIG. 2(*b*), FIG. 3(*b*), FIG. 4(*b*), FIG. 5(*b*), or other possible plot, which is generated by spatial convolution of the transmitting antennas and the receiving antennas.

In the step 1502, the at least two RF signals transmitted by the at least two transmitting antennas can be OFDM signals applied with cyclic shift diversity. Specifically, the at least two RF signals can be cyclic shifted in time domain. The OFDM signals can be used to form virtually orthogonal transmitter (TX) ports that are distinguishable at each of the at least one receiving antenna of the joint communication and sensing transceiver.

In the step 1502, the at least two RF signals transmitted by the at least two transmitting antennas may optionally contain TX-varying phase rotations.

In the step 1502, the cyclic shift diversity and the TX-varying phase rotation for each transmitting (TX) antennas can be chose by referred to Case 2 and Case 7 above and the communication performance and sensing ability of which can be referred to FIG. 7, FIG. 8, FIG. 9, FIG. 10, FIG. 11 and FIG. 12.

In the step 1502, the TX-varying phase rotations are determined based on spatial domain information of the communication receiver. The cyclic shift diversity and the TX-varying phase rotation for each of the at least two transmitting antennas forming at least one transmitting array can be chosen by referred to Case 8 and Case 9 to generate the a beam pattern of AoD whose angular frequency-domain flatness mainlobe direction aligns with that of a phase vector of the TPMI.

By applying the method (1500) of joint communication and sensing of the target obstacle (object or human) in accordance with a fifth embodiment of the present disclosure, an azimuth angle and an elevation angle of the target obstacle can be obtained to accomplish 3-D sensing ability by utilizing the 2-D spectral estimation algorithm, such as 2D FFT, 2D CLEAN, etc.

The preferred embodiments of the present invention have been described above. However, those having ordinary skill in the art readily recognize that the disclosure described above can be utilized in a variety of devices, environments, and situations. Although the present invention is written with respect to specific embodiments and implementations, various changes and modifications may be suggested to a person having ordinary skill in the art. It is intended that the present disclosure encompass such changes and modifications that fall within the scope of the appended claims.

For example, those having ordinary skill in the art would understand that a device, such as a UE and a gNB, may include a processor, memory in electronic communication with the processor, and instructions stored in the memory. The instructions are used to perform the methods in accordance with the embodiments above.

In addition, those having ordinary skill in the art would understand that a device capable of joint communication and sensing of a target obstacle (object or human), such as a UE and a gNB, can be provided based on the fifth embodiment of the present disclosure. The device may comprise a joint communication and sensing transceiver, comprising a transmitter (TX) having at least two transmitting antennas and a receiver (RX) having at least one receiving antenna; wherein the at least two transmitting antennas transmit data on at least two cyclic shifted radio frequency (RF) signals to a communication receiver; and wherein the at least one receiving antenna receives at least one reflected cyclic shifted radio frequency (RF) signal reflected by the target obstacle; and wherein at least two cyclic shifted radio frequency (RF) signals contain TX-varying phase rotations.

In addition, those having ordinary skill in the art would understand the device capable of joint communication and sensing of a target obstacle (object or human) may also include radar receiving antennas used for sensing in addition to receiving antennas used for data communication. The radar receiving antennas used for sensing and the receiving antennas used for data communication may or may not be co-located but share information of transmitting antennas for virtual receiving array and for demodulation.

What is claimed is:

1. A method of joint communication and sensing of a target obstacle, comprising:

deploying a joint communication and sensing transceiver, comprising a transmitter (TX) having at least two transmitting antennas and a receiver (RX) having at least one receiving antenna;

transmitting at least two radio frequency (RF) signals carrying data to a communication receiver by the at least two transmitting antennas; and receiving at least one reflected radio frequency (RF) signal reflected by the target obstacle by the at least one receiving antenna;

wherein the at least two RF signals transmitted by the at least two transmitting antennas are generated to implement cyclic shift diversity; and wherein the at least two RF signals transmitted by the at least two transmitting antennas contain TX-varying phase rotations.

2. The method of claim 1, wherein the at least two RF signals are cyclic shifted in time domain.

3. The method of claim 1, wherein a virtual receiving array is generated by the at least two transmitting antennas and the at least one receiving antenna.

4. The method of claim 3, wherein the at least two transmitting antennas form at least one transmitting array.

5. The method of claim 1, wherein the at least two radio frequency (RF) signals are orthogonal frequency domain multiplexing (OFDM) signals.

6. The method of claim 5, wherein the at least two radio frequency (RF) signals form virtually orthogonal transmitter (TX) ports that are distinguishable at each of the at least one receiving antenna of the joint communication and sensing transceiver.

7. The method of claim 1, wherein the TX-varying phase rotations are determined based on spatial domain information of the communication receiver.

8. The method of claim 7, wherein the spatial domain information is a transmit precoder matrix indicator (TPMI) adopted by the communication receiver and sent from the communication receiver.

9. The method of claim 8, the at least two transmitting antennas form at least one transmitting array and wherein the cyclic shift diversity and the TX-varying phase rotation for each of the at least two transmitting antennas are chosen for the at least one transmitting array to generate a beam pattern of an Angle of Departure (AoD) whose angular frequency-domain flatness mainlobe direction aligns with that of a phase vector of the TPMI.

10. A method of joint communication and sensing a target obstacle, comprising:

deploying a joint communication and sensing transceiver, comprising a transmitter (TX) having at least two transmitting antennas and a receiver (RX) having at least one receiving antenna;

transmitting at least two radio frequency (RF) signals carrying data to a communication receiver by the at least two transmitting antennas; and receiving at least one reflected radio frequency (RF) signal reflected by the target obstacle by the at least one receiving antenna;

wherein the at least two RF signals transmitted by the at least two transmitting antennas are generated to implement cyclic shift diversity.

11. The method of claim 10, wherein the at least two RF signals are cyclic shifted in time domain.

12. The method of claim 10, wherein a virtual receiving array is generated by the at least two transmitting antennas and the at least one receiving antenna.

13. The method of claim 12, wherein the at least two transmitting antennas form at least one transmitting array.

14. The method of claim 10, wherein the at least two radio frequency (RF) signals are orthogonal frequency domain multiplexing (OFDM) signals.

15. The method of claim 14, wherein the at least two radio frequency (RF) signals form virtually orthogonal transmitter (TX) ports that are distinguishable at each of the at least one receiving antenna of the joint communication and sensing transceiver.

16. The method of claim 10, wherein an azimuth angle and an elevation angle of the target obstacle is obtained.

17. A device capable of joint communication and sensing of a target obstacle, comprising:

a joint communication and sensing transceiver, comprising a transmitter (TX) having at least two transmitting antennas and a receiver (RX) having at least one receiving antenna;

wherein the at least two transmitting antennas transmit data on at least two cyclic shifted radio frequency (RF) signals to a communication receiver; and wherein the at least one receiving antenna receives at least one reflected cyclic shifted radio frequency (RF) signal reflected by the target obstacle; and wherein at least two cyclic shifted radio frequency (RF) signals contain TX-varying phase rotations, and the at least two cyclic shifted radio frequency (RF) signals are generated to implement cyclic shift diversity.

18. The device of claim 17, wherein the at least two cyclic shifted radio frequency (RF) signals form virtually orthogonal transmitter (TX) ports that are distinguishable at each of the at least one receiving antenna of the joint communication and sensing transceiver.

19. The device of claim 17, wherein the TX-varying phase rotations are determined based on spatial domain information of the communication receiver.

20. The device of claim 19, wherein the spatial domain information is a transmit precoder matrix indicator (TPMI) adopted by the communication receiver and sent from the communication receiver.

* * * * *